US012322292B2

(12) United States Patent
Wyrobek et al.

(10) Patent No.: US 12,322,292 B2
(45) Date of Patent: Jun. 3, 2025

(54) ACOUSTIC BASED DETECTION AND AVOIDANCE FOR AIRCRAFT

(71) Applicant: ZIPLINE INTERNATIONAL INC., South San Francisco, CA (US)

(72) Inventors: Keenan A. Wyrobek, Half Moon Bay, CA (US); Matthew O. Derry, Ann Arbor, MI (US); Rohit H. Sant, San Mateo, CA (US); Gavin K Ananda Krishnan, San Carlos, CA (US); Thomas O. Teisberg, Menlo Park, CA (US); Michael J. Demertzi, Half Moon Bay, CA (US)

(73) Assignee: Zipline International, Inc., South San Francisco, CA (US)

( * ) Notice: Subject to any disclaimer, the term of this patent is extended or adjusted under 35 U.S.C. 154(b) by 803 days.

(21) Appl. No.: 17/138,063

(22) Filed: Dec. 30, 2020

(65) Prior Publication Data

US 2021/0225182 A1    Jul. 22, 2021

Related U.S. Application Data

(60) Provisional application No. 63/082,838, filed on Sep. 24, 2020, provisional application No. 63/021,633, (Continued)

(51) Int. Cl.
*G08G 5/80* (2025.01)
*G06N 3/08* (2023.01)
(Continued)

(52) U.S. Cl.
CPC ............... *G08G 5/80* (2025.01); *G06N 3/08* (2013.01); *G08G 5/21* (2025.01); *G08G 5/34* (2025.01);
(Continued)

(58) Field of Classification Search
CPC .... G08G 5/045; G08G 5/0021; G08G 5/0039; G08G 5/006; G08G 5/0052;
(Continued)

(56) References Cited

U.S. PATENT DOCUMENTS 2,663,518 A    12/1953 Glenn
3,444,508 A    5/1969 Granfors et al.
(Continued)

FOREIGN PATENT DOCUMENTS

EP    1571875 A2    9/2005
EP    1946606 B1    11/2010
(Continued)

OTHER PUBLICATIONS

International Search Report and Written Opinion issued in International Patent Application No. PCT/US2020/067464 on Mar. 31, 2021 (13 pages).
(Continued)

*Primary Examiner* — Jonathan M Dager
(74) *Attorney, Agent, or Firm* — Dorsey & Whitney LLP

(57) ABSTRACT

An audio signal received at audio sensors of an aircraft is analyzed to determine directional information for a source of the audio signal. A location of the source of the audio signal is determined based on the directional information for the source of the audio signal.

22 Claims, 9 Drawing Sheets

Related U.S. Application Data filed on May 7, 2020, provisional application No. 62/984,266, filed on Mar. 2, 2020, provisional application No. 62/955,946, filed on Dec. 31, 2019.

(51) Int. Cl.
  *G08G 5/21* (2025.01)
  *G08G 5/34* (2025.01)
  *G08G 5/55* (2025.01)
  *G08G 5/59* (2025.01)
  *B64U 101/30* (2023.01)

(52) U.S. Cl.
  CPC ............... *G08G 5/55* (2025.01); *G08G 5/59* (2025.01); *B64U 2101/30* (2023.01)

(58) Field of Classification Search
  CPC .............. G08G 5/0078; B64C 39/024; B64C 2201/12; G06N 3/08; G06N 3/0445; G06N 3/0454; G06N 5/003; G06N 20/20
  See application file for complete search history.

(56) References Cited

U.S. PATENT DOCUMENTS

| | | | |
|---|---|---|---|
| 3,893,061 A | 7/1975 | Slawsky et al. | |
| 3,964,694 A | 6/1976 | Metzger et al. | |
| 4,106,740 A | 8/1978 | Lloyd et al. | |
| 4,509,151 A | 4/1985 | Anderson | |
| 4,622,657 A | 11/1986 | Clare | |
| 4,811,308 A | 3/1989 | Michel | |
| 4,831,874 A | 5/1989 | Daubin et al. | |
| 4,926,171 A | 5/1990 | Kelley | |
| 4,974,213 A | 11/1990 | Siwecki | |
| 5,062,085 A | 10/1991 | Andrews, Jr. | |
| 5,111,400 A | 5/1992 | Yoder | |
| 5,150,336 A | 9/1992 | Sullivan et al. | |
| 5,177,316 A | 1/1993 | Honigsbaum | |
| 5,410,519 A | 4/1995 | Hall et al. | |
| 5,477,506 A | 12/1995 | Allen | |
| 5,563,849 A | 10/1996 | Hall et al. | |
| 5,575,438 A | 11/1996 | Mcgonigle et al. | |
| 5,617,371 A | 4/1997 | Williams | |
| 5,699,437 A | 12/1997 | Finn | |
| 5,748,143 A | 5/1998 | Melvin, Jr. | |
| 5,861,846 A | 1/1999 | Minter | |
| 5,901,232 A | 5/1999 | Gibbs | |
| 5,909,409 A | 6/1999 | Barber et al. | |
| 5,995,445 A | 11/1999 | Whitesell et al. | |
| 6,201,482 B1 | 3/2001 | Schiefele et al. | |
| 6,288,973 B1 | 9/2001 | Joynes | |
| 6,588,701 B2 | 7/2003 | Yavnai | |
| 6,621,764 B1 | 9/2003 | Smith | |
| 6,705,573 B2 | 3/2004 | Mcdonnell | |
| 6,760,449 B1 | 7/2004 | Matsuo | |
| 6,795,772 B2 | 9/2004 | Lin et al. | |
| 6,804,607 B1 | 10/2004 | Wood | |
| 6,857,601 B2 | 2/2005 | Akahori | |
| 6,859,420 B1 | 2/2005 | Coney et al. | |
| 6,970,796 B2 | 11/2005 | Tashev | |
| 7,079,450 B2 | 7/2006 | Breed et al. | |
| 7,149,147 B1 | 12/2006 | Goldman et al. | |
| 7,209,221 B2 | 4/2007 | Breed et al. | |
| 7,228,232 B2 | 6/2007 | Bodin et al. | |
| 7,372,773 B2 | 5/2008 | Horak | |
| 7,457,619 B2 | 11/2008 | Ariyur et al. | |
| 7,548,488 B2 | 6/2009 | Horak et al. | |
| 7,606,115 B1 | 10/2009 | Cline et al. | |
| 7,720,232 B2 | 5/2010 | Oxford | |
| 7,751,976 B2 | 7/2010 | Matuska et al. | |
| 7,818,127 B1 | 10/2010 | Duggan et al. | |
| 7,864,096 B2* | 1/2011 | Stayton ............... G08G 5/0021 342/63 | |
| 7,975,959 B2 | 7/2011 | Perry et al. | |
| 7,991,167 B2 | 8/2011 | Oxford | |
| 8,809,755 B1 | 8/2014 | Patel et al. | |
| 10,370,093 B1* | 8/2019 | Beckman ............. B64C 27/001 | |
| 10,473,752 B2* | 11/2019 | Xie ........................ H04R 1/04 | |
| 10,586,464 B2* | 3/2020 | Dupray ............... G08G 5/0021 | |
| 10,935,630 B2* | 3/2021 | Swanson ................ G01S 5/20 | |
| 11,307,285 B2* | 4/2022 | Rittenschober ......... G01S 5/18 | |
| 11,531,100 B2* | 12/2022 | Staudinger ........... G01S 13/862 | |
| 11,594,142 B1* | 2/2023 | Cleckler ................ G01S 5/20 | |
| 12,165,532 B1* | 12/2024 | Jenkins ............... G08G 5/0008 | |
| 2003/0185410 A1 | 10/2003 | June et al. | |
| 2004/0105557 A1 | 6/2004 | Matsuo | |
| 2004/0165736 A1 | 8/2004 | Hetherington et al. | |
| 2004/0252845 A1 | 12/2004 | Tashev | |
| 2005/0271221 A1* | 12/2005 | Cerwin .................. H04R 3/005 381/91 |
| 2007/0024489 A1* | 2/2007 | Cerwin .................... G01V 3/17 342/25 A |
| 2008/0167835 A1* | 7/2008 | Zank ........................ G01S 5/00 702/151 |
| 2008/0212819 A1* | 9/2008 | Cerwin .................. H04R 1/086 381/359 |
| 2009/0184862 A1* | 7/2009 | Stayton ................ G08G 5/0078 342/63 |
| 2010/0100269 A1* | 4/2010 | Ekhaguere ............. G05D 1/106 701/26 |
| 2010/0121574 A1* | 5/2010 | Ariyur ................. G08G 5/0069 701/301 |
| 2015/0170527 A1* | 6/2015 | Filias .................... G08G 5/0052 701/301 |
| 2015/0302858 A1* | 10/2015 | Hearing ..................... G01H 1/00 381/58 |
| 2016/0063987 A1* | 3/2016 | Xu ..................... G10K 11/17881 381/71.14 |
| 2016/0068267 A1* | 3/2016 | Liu ......................... G05D 1/042 701/4 |
| 2016/0171896 A1* | 6/2016 | Buchmueller ............ G08G 5/25 701/3 |
| 2016/0247405 A1* | 8/2016 | Paczan ................... G08G 5/26 |
| 2016/0247407 A1* | 8/2016 | Paczan ................. G08G 5/0013 |
| 2017/0061981 A1 | 3/2017 | Nakadai et al. | |
| 2017/0092138 A1 | 3/2017 | Trundle et al. | |
| 2017/0148467 A1* | 5/2017 | Franklin ................. G10L 25/39 |
| 2017/0219686 A1* | 8/2017 | Xie ......................... G01S 11/14 |
| 2017/0220036 A1 | 8/2017 | Visser et al. | |
| 2017/0234724 A1 | 8/2017 | Naguib et al. | |
| 2017/0235316 A1* | 8/2017 | Shattil ..................... H04W 4/40 701/3 |
| 2018/0011180 A1* | 1/2018 | Warnick ................. H01Q 21/064 |
| 2018/0091908 A1 | 3/2018 | Goel et al. | |
| 2018/0196435 A1 | 7/2018 | Kunzi et al. | |
| 2018/0253980 A1* | 9/2018 | Mohamadi ........... G05D 1/0055 |
| 2018/0329020 A1* | 11/2018 | Hafizovic ................ G01S 5/20 |
| 2019/0018130 A1 | 1/2019 | Griggs | |
| 2019/0039712 A1 | 2/2019 | Moore et al. | |
| 2019/0095687 A1* | 3/2019 | Shaw .................... A61B 5/1079 |
| 2019/0297412 A1* | 9/2019 | Hentunen ............. G10K 11/175 |
| 2019/0317530 A1* | 10/2019 | Yang ........................ G08G 5/006 |
| 2019/0371183 A1* | 12/2019 | Mecklem ................. G08G 5/21 |
| 2020/0064438 A1* | 2/2020 | Swanson ............... G01S 3/8022 |
| 2020/0092643 A1* | 3/2020 | Cordourier Maruri .. G06N 3/04 |
| 2020/0285202 A1 | 9/2020 | Fujishima et al. | |
| 2020/0336826 A1* | 10/2020 | Gupta ..................... H04R 17/02 |
| 2020/0393562 A1* | 12/2020 | Staudinger ............. G01S 19/14 |
| 2021/0065564 A1* | 3/2021 | Vacek ...................... G05D 1/12 |
| 2021/0255356 A1* | 8/2021 | Vu .......................... G01V 8/005 |
| 2021/0256987 A1* | 8/2021 | Edlin ..................... G10L 25/57 |
| 2022/0011786 A1* | 1/2022 | Teisberg ............... G08G 5/0078 |
| 2022/0053254 A1* | 2/2022 | Wyrobek ............... H04R 1/086 |
| 2022/0114997 A1* | 4/2022 | Takahashi ............... H04R 1/406 |

FOREIGN PATENT DOCUMENTS

| | | |
|---|---|---|
| GB | 2309301 A | 7/1997 |
| GB | 2350425 B | 3/2003 |
| GB | 2380244 A | 4/2003 |
| JP | 2002039851 A | 2/2002 |
| JP | 2006319789 A | 11/2006 |
| JP | 2011112370 A | 6/2011 |

(56) References Cited

FOREIGN PATENT DOCUMENTS

| | | |
|---|---|---|
| JP | 2017501475 A | 1/2017 |
| JP | 2017044916 A | 3/2017 |
| JP | 2017156122 A | 9/2017 |
| JP | 2018090117 A | 6/2018 |
| JP | 2019105891 A | 6/2019 |
| KR | 100520786 B1 | 10/2005 |
| KR | 20060011064 A | 2/2006 |
| WO | 9602905 A1 | 2/1996 |
| WO | 2005006009 A2 | 1/2005 |
| WO | 2005012079 A1 | 2/2005 |
| WO | 2006113104 A2 | 10/2006 |
| WO | 2016033796 A1 | 3/2016 |
| WO | 2019221613 A1 | 11/2019 |

OTHER PUBLICATIONS

Andersson, Sean et al. "Robot Phonotaxis with Dynamic Sound-source Localization," Proceedings of the 2004 IEEE, Int'l Conf. on Robotics & Automation, 2004.
Barfield, Finley, "Autonomous Collision Avoidance the Technical Requirements," Proc. of the IEEE 2000, Nat'l Aerospace and Elecs. Conf., 808-813, 2000.
Batel, Medhi et al. "Noise Source Location Techniques—Simple to Advanced Applications," Sound and Vibration, 2003.
Becker, Gunnar, "Non-Cooperative Helicopter Detection by Acoustical Sensors," RTO Meeting Proceedings 6, Symposium of the RTO Systems Concepts and Integration Panel (SCI) held in Mannheim, Germany, 1998.
Boucek, G. Jr. et al. "Traffic Alert and Collision Avoidance System," Final Report, U.S. Dep't of Transp., FAA, 1985.
Buckingham, Michael et al. "Propeller Noise from a Light Aircraft for Low-Frequency Measurements of the Speed of Sound in a Marine Sediment," J. Computational Acoustics, 10(4): 445-464, 2002.
Carneal, James et al. "Comparison of a Diffracting and a Non-Diffracting Circular Acoustic Array," 2006 IEEE Int'l Conf. on Acoustics Speech and Signal Processing Proceedings, 2006.
Clark, Timothy, "Evaluation of a Two-way Datalink for Airborne Surveillance of and Communication with a Remotely Operated Aircraft Operating in the National Airspace System," Trace, Master's Thesis, Univ. of Tenn. 2002.
Cross, J. "Y0-3A Acoustics Research Aircraft Systems Manual," NASA Technical Memorandum 85968, 1984.
Cross, Jeffrey et al. "In-Flight Acoustic Testing Techniques Using the Y0-3A Acoustic Research Aircraft," NASA Technical Memorandum 85895, 1984.
Cruz, Nuno et al. "Operations with Multiple Autonomous Underwater Vehicles: the PISCIS Project," Symposium AINS, 2003.
Damarla, Raju et al. "An algorithm for classifying multiple targets using acoustic signatures," Proc. of SPIE 5429, Signal Processing, Sensor Fusion, and Target Recognition XIII, 5429: 421-427, 2004.
Depireux, D. et al. Vehicle Classification Using a Biological Model of Hearing, Insitute for Systems Research University of Maryland College, 2000.
Dougherty, Robert, "Extensions of DAMAS and Benefits and Limitations of Deconvolution in Beamforming," 11th AIAA/CEAS Aeroacoustics Conference, 2005.
Duckworth, Gregory et al. "Acoustic counter-sniper system," Proc. of SPIE 2938, Command, Control, Communications, and Intelligence Systems for Law Enforcement, 2938: 262-275, 1997.
Erzberger, Heinz et al. "Concept for Next Generation Air Traffic Control System," Air Traffic Control Quarterly, 10(4) 355-378, 2002.
Erzberger, Heinz, "Automated Conflict Resolution for Air Traffic Control," ICAS 2006, 25th Int'l Cong. of the Aeronautical Scis., 2006.
Erzberger, Heinz, "Transforming the NAS: The Next Generation Air Traffic Control System," ICAS 2004, 24th Int'l Cong. of the Aeronautical Scis., 2004.
Ferguson, Brian et al. "Detection and Localisation of a Ground Based Impulsive Sound Source using Acoustic Sensors Onboard a Tactical Unmanned Aerial Vehicle," Battlefield Acoustic Sensing for ISR Applications, 16-1-16-8, 2006.
Ferguson, Brian et al. "Locating far-field impulsive sound sources in air by triangulation," J. Acoust. Soc. Am., 111(1), 104-116, 2002.
Ferguson, Brian et al. "Turboprop and rotary-wing aircraft flight parameter estimation using both narrow-band and broadband passive acoustic signal-processing methods," J. Acoust. Soc. Am., 108, 4, 1763-1771, 2000.
Ferguson, Brian. "A ground-based narrow-band passive acoustic technique for estimating the altitude and speed of a propeller-driven aircraft," J. Acoust. Soc. Am., 92(3), 1403-1407, 1992.
Freitag, Lee et al. "The WHOI Micro-Modem: An Acoustic Communications and Navigation System for Multiple Platforms," Proc. of Oceans 2005 MTS/IEEE, 2, 1086-1092, 2005.
Gade, S. et al. "190 A Review of Array Techniques for Noise Source Location," JSAE Spring Convention, 2003.
Glegg, Stewart et al. "A Passive Sonar System Based on an Autonomous Underwater Vehicle," IEEE J. Oceanic Eng'g, 26(4): 700-710, 2001.
Gunnar Becker and Alwin Güdesen, Passive sensing with acoustics on the battlefield, Applied Acoustics 59:149-178 (2000).
Haering, Edward A. et al. "Preliminary Airborne Measurements for the SR-71 Sonic Boom Propagation Experiment," NASA Technical Memorandum 104307, 1995.
Hald, J. "An Integrated NAH/Beamforming Solution for Efficient Broad-Band Noise Source Location," SAE 2005 Noise and Vibration Conference and Exhibition, 2005-01-2537, 2005.
Hald, J. et al. "A novel beamformer array design for noise source location from intermediate measurement distances," J. Acoust. Soc. Am. 2002.
Hald, Jørgen et al. "Combined NAH and Beamforming Using the Same Microphone Array," Sound and Vibration, 2004.
He, Zhihai et al. "Vision-Based UAV Flight Control and Obstacle Avoidance," Proc. of the 2006 Am. Control Conf. 2166-2170, 2006.
Hohil, Myron et al. "Vehicle counting and classification algorithms for unattended ground sensors," Proc. of SPIE 5090, Unattended Ground Sensor Technologies and Applications V, 5090: 99-110, 2003.
Hwang, Soojung et al. "Collision Avoidance Maneuver Simulation of Tilt Rotor Unmanned Aerial Vehicle," 44th AIAA Aerospace Sciences Meeting and Exhibit, AIAA 2006-235, 2006.
Ikeda, Y. et al. "Automatic Air Collision Avoidance System," Air Force Research Laboratory, AFRL-VA-WP-TP-2002-317, 2002.
Janik, V.M. et al. "A Two-Dimensional Acoustic Localization System for Marine Mammals," Marine Mammal Science, 16(2): 437-447, 2000.
Kaushik, B. et al. "A Review of the Role of Acoustic Sensors in the Modern Battlefield," 11th AIAA/CEAS Aeroacoustics Conf., 26th AIAA Aeroacoustics Conf., May 2005, Monterey, California.
Kraft, Robert, "Volume 2: Development of a Ground-Based Acoustic Sensor System for the Detection of Subsonic Jet-Powered Aircraft," Aircraft IR/Acoustic Detection Evaluation, NASA Contractor Report 189705, 1992.
Kuchar, James et al. "A Safety Analysis Process for the Traffic Alert and Collision Avoidance System (TCAS) and See-and-Avoid Systems on Remotely Piloted Vehicles," AIAA 3rd Unmanned Unlimited Technical Conference, Workshop and Exhibit, AIAA, 2004.
Lacher, Andrew et al. "Unmanned Aircraft Collision Avoidance—Technology Assessment and Evaluation Methods," MITRE Corp., 2007.
Leighton, T.G. "Chapter 7: Fundamentals of underwater acoustics, Fundamentals of noise and vibration," Taylor & Francis, 373-443, Frank Fahy and John Gerard Walker eds., 1998.
Lemon, Stanley, "Towed-Array History," 1917-2003, IEEE J. Oceanic Eng'g, 29(2): 365-373, 2004.
Lo, Kam et al. "Broadband Passive Acoustic Technique for Target Motion Parameter Estimation," IEEE Transactions on Aerospace and Electronic Systems, 36(1), 163-175, 2000.
Lo, Kam et al. Tactical Unmanned Aerial Vehicle Localization Using Ground-Based Acoustic Sensors, Proceedings of the 2004

(56) References Cited

OTHER PUBLICATIONS

Intelligent Sensors, Sensor Networks and Information Processing Conference, ISSNIP 2004, 475-480, 2005.
Mann, David et al. "Chapter 9: Active and Passive Acoustics to Locate and Study Fish," Fish Bioacoustics, 279-309, 2008.
Matos, Anibal et al. "Development and Implementation of a Low-Cost LBL Navigation System for an AUV," Oceans '99 MTS/IEEE, Riding the Crest into the 21st Century, 1999.
Mennitt, Dan et al. "Tracking Noise Sources Using Multiple Mobile Microphone Arrays," ICSV13—Vienna, 13th Int'l Cong. on Sound and Vibration, 2006.
Merlin, Peter, Ikhana Unmanned Aircraft System: Western States Fire Missions, NASA, Monographs in Aerospace History #44, NASA, 2009.
Metcalf, Marvin, "Acoustics on the 21st Century Battlefield," Joint Force Quarterly, Winter 1995-1996.
Michel, U. et al. "Investigation of airframe and jet noise in high-speed flight with a microphone array," 3rd AIAA/CEAS Aeroacoustics Conf., 1997.
Penney, R. "Collision avoidance within flight dynamics constraints for UAV applications," Aeronautical J., 193-199, 2005.
Pham, Tien et al. "Acoustic Data Collection of Tactical Unmanned Air Vehicles (TUAVs)," Army Research Laboratory, ARL-TR-2749, 2002.
Pham, Tien et al. "Acoustic Detection and Tracking of Small, Low-Flying Threat Aircraft," US Army Research Laboratory, 2002.
Pham, Tien et al. "Acoustic Signal Processing Toolbox for Array Processing," Proc. of SPIE 5096, Signal Processing, Sensor Fusion, and Target Recognition XII, 5096:597-606, 2003.
Pham, Tien et al. "Acoustic tracking of ground vehicles using ESPRIT," Proc. of SPIE 2485, Automatic Object Recognition V, 2485:268-274, 1995.
Pham, Tien et al. "Adaptive Wideband Aeroacoustic Array Processing," Proceedings of 8th Workshop on Statistical Signal and Array Processing, 295-298, 1996.
Pham, Tien et al. "TTCP AG-6: Acoustic Detection and Tracking of UAVs," Proc. of SPIE 5417, Unattended/Unmanned Ground, Ocean, and Air Sensor Technologies and Applications VI, 5417:24-30, 2004.
Phillips, Richard et al. "Determination of West Indian manatee vocalization levels and rate," J. Acoust. Soc. Am., 115(1) 422-428, 2004.
Piet, J. et al. "Localization of the Acoustic Sources of the A340 with a Large Phased Microphone Array During Flight Tests," Am. Instr. of Aeronautics and Astronautics Paper 2002-2506, 2002.
Rascon, Caleb et al. Localization of sound sources in robots: A review, Robotics and Autonomous Sys., 96, 184-210, 2017.
Reeder, C. et al. "Two-Hydrophone Heading and Range Sensor Applied to Formation-Flying for AUVs," IEEE, 517-523, 2004.
Reiff, C. et al. "Acoustic Detection and Localization from a Tethered Aerostat during the NATO TG-53 Test," Proc. of SPIE, Int'l Soc. For Optical Eng'g, 2006.
Reiff, C. et al. "Acoustic Detection from Aerial Balloon Platform," 2004.
Robertson, Dale et al. "Acoustic Sensing from small-size UAVs," Proc. of SPIE 6562, Unattended Ground, Sea, and Air Sensor Technologies and Applications IX, 6656208-1-656208-8, 2007.
Robertson, Dale et al. "NATO TG-53: Acoustic Detection of Weapon Firing Joint Field Experiment," Proc. of SPIE 6231, Unattended Ground, Sea, and Air Sensor Technologies and Applications VIII, 2006.
Scanlon, Michael et al. "Acoustic Transient Source Localization from an Aerostat," ASC, 2006.
Scanlon, Michael et al. "Aerostat Acoustic Payload for Transient and Helicopter Detection," Proc. of SPIE 6538, Sensors, and Command, Control, Communications, and Intelligence (C3I) Technologies for Homeland Security and Homeland Defense, 2007.
Scanlon, Michael et al. "Networked Acoustic Sensor Array's Performance During 2004 Horizontal Fusion—Warrior's Edge Demonstration," 2004.
Shakernia, Omid et al. "Passive Ranging for UAV Sense and Avoid Applications," Infotech@Aerospace, AIAA 2005-7179, 2005.
Sijtsman, Pieter et al. "Determination of Absolute Contributions of Aircraft Noise Components using Fly-Over Array Measurements," 10th AIAA/CEAS Aeroacoustics Conference, AIAA 2004-2958, 2004.
Sour, Nassy, Back Propagation of Acoustic Signature for Robust Target Identification, Proc. of SPIE 4232, Enabling Technologies for Law Enforcement and Security, 4232: 399-408, 2001.
Srour, Nassy et al. "Remote Netted Acoustic Detection System: Final Report," Army Research Laboratory, ARL-TR-706, 1995.
Sundqvist, Bengt-Göran, Auto-ACAS—Robust Nuisance-Free Collision Avoidance, Proc. of the 44th IEEE Conf. on Decision and Control Conference, 2005, pp. 3961-3963.
Swihart, Donald et al. "Integration Techniques for Preventing Collisions Between Air Vehicles," Air Force Research Laboratory, 2002.
Thirtle, Michael et al. "The Predator ACTD: a case study for transition planning to the formal acquisition process," RAND, 1997.
Valin, Jean-Marc et al. "Localization of Simultaneous Moving Sound Sources for Mobile Robot Using a Frequency-Domain Steered Beamformer Approach," Proc. of the 2004 IEEE, Int'l Conf. on Robotics & Automation, 1033-1038, 2004.
Valin, Jean-Marc et al. "Robust Sound Source Localization Using a Microphone Array on a Mobile Robot," Proc. of the 2003 IEEE/RSJ, Int'l Conf. on Intelligent Robots and Sys., 1228-1233, 2003.
Washburn, Karl et al. Correlating Noise Sources Identified by Beamforming with Sound Power Measurements, 2005-01-2510, SAE Int'l, 2005.
Wellman, Mark et al. "Enhanced Target Identification Using Higher Order Shape Statistics," Army Research Laboratory, ARL-TR-1723, 1999.
Williams, Chad et al. "Method for triangulation on a moving broadband airborne target," Proc. of SPIE 4393, Unattended Ground Sensor Technologies and Applications III, 4393, 30-39, 2001.
Williams, Ross et al. "Passive Acoustic Synthetic Aperture Processing Techniques," IEEE J. Oceaning Eng'g, 17(1): 8-15, 1992.
Yamamoto, Shun'ichi et al. "Real-Time Robot Audition System That Recognizes Simultaneous Speech in the Real World," Proc. of the 2006 IEEE/RSJ, Int'l Conf. on Intelligent Robots and Sys., 5333-5338, 2006.
Young, Stuart et al. "Acoustic Sensors on Small Robots for the Urban Environment," Proc. of SPIE 5804, Unmanned Ground Vehicle Technology VII, 5804: 97-108, 2005.
Young, Stuart et al. "Detection and Localization with an Acoustic Array on a Small Robotic Platform in Urban Environments," Army Research Laboratory, ARL-TR-2575, 2003.
Office Action dated Jul. 4, 2023 in connection with Japanese patent application No. JP 2022-565730, 15 pages including English translation.
Cline, et al. "The LOW-cost Scout uav Acoustic System (LOSAS)," Scientific Applications & Research Associates, 21 pages.
Defendant Zipline International Inc.'s Third Amended Invalidity Contentions, Mar. 15, 2024, 155 pages.
Milkie et al. "UAV Acoustic Sensor Concepts of Operation," Scientific Applications & Research Assoc, Inc (SARA), 19 pages.
Muller, et al. "Low Cost Scout UAV Acoustic System (LOSAS): Technology Overview and Demonstration Status," SARA, 14 pages.
Wes, et al. "The LOW-cost Scout uav Acoustic System (LOSAS)," Scientific Applications & Research Associates, 23 pages.
Extended European Search Report dated Mar. 13, 2024 in connection with European patent application No. 20908448.2, 8 pages.
Subpoena to Testify at a Deposition in a Civil Action, dated Mar. 14, 2024, Civil Action No. 3:22-cv-04480-JSC, 6 pages.
Plaintiff Sara, Inc.'s Notice of Third Party Deposition Subpoena to Dorsey Whitney LLP, Mar. 14, 2024, 9 pages.
Supplemental Complaint dated Feb. 9, 2024 in connection with Civil Action No. 3:22-cv-04480-JSC, 178 pages.
Exhibit B in Civil Action No. 3:22-cv-04480-JSC, U.S. Pat. No. 7,606,115, 8 pages.
Demand for Jury Trial dated Feb. 23, 2024 in connection with Civil Action No. 3:22-cv-04480-JSC, 120 pages.

(56) References Cited

OTHER PUBLICATIONS

Exhibit 0005 in connection with Civil Action No. 3:22-CV-04480-JSC, MPEP Jun. 2001, Sources of Information under 37 CFR 1.56, 3 pages.
Exhibit 0006 in Civil Action No. 3:22-CV-04480-JSC, U.S. Appl. No. 63/082,838, 4th provisional application, 46 pages.
Exhibit 0007 in Civil Action No. 3:22-CV-04480-JSC, U.S. Appl. No. 63/082,832, 5th provisional application, 33 pages.
Exhibit 8 in Civil Action No. 3:22-CV-04480-JSC, Zipline Meetings 2020-2022, 9 pages.
Exhibit 1 in Civil Action No. 3:22-CV-04480-JSC, U.S. Patent Publication No. 20210225182A1, 23 pages.
Exhibit 2 in Civil Action No. 3:22-CV-04480-JSC, US Patent Publication No. 20220011786A1, 20 pages.
Exhibit 3 in Civil Action No. 3:22-CV-04480-JSC, US Patent Publication No. 20220053254A1, 21 pages.
Exhibit 4 in Civil Action No. 3:22-CV-04480-JSC, US Patent Publication No. 20230396909A1, 22 pages.
Exhibit 13 in Civil Action No. 3:22-CV-04480-JSC, Cline I, UAV Acoustic Sensor Technology Demonstrations and Capability Expansion, 20 pages.
Exhibit 14 in Civil Action No. 3:22-CV-04480-JSC, Cline II, Unmanned Systems North America Conference 2006, 27 pages.
Exhibit 15 in Civil Action No. 3:22-CV-04480-JSC, May 29, 2024 Court Transcript, 51 pages.
Exhibit 16 in Civil Action No. 3:22-CV-04480-JSC, Response to 101 Rejection in U.S. Patent Publication 20220011786A1, 2nd Non-Provisional Application, 5 pages.
Transcript of Proceedings dated May 29, 2024 in connection with *Scientific Applications & Research Associates (SARA), Inc.* vs. *Zipline International, Inc.* 50 pages.
Allen et al., "AIAA 93-4343 Aeroacoustic Probe Design for Microphone to Reduce Flow-Induced Self-Noise," NASA Ames Research Center, Oct. 25, 1993, 11 pages.
Neiset, "Theoretical and Experimental Investigations of Microphone Probes for Sound Measurements in Turbulent Flow," Journal of Sound and Vibration, Jun. 7, 1974, 39 (3), 371-400.
Brown et al. "Acoustic Methods Used in the NASA Glenn 9-by 15-Foot Low-Speed Wind Tunnel," NASA Glenn Research Center, Jun. 2018, 50 pages.
Fields, "An Experimental Investigation of Flow-Induced Oscillations of the Brüel & Kjær In-Flow Microphone," Thesis, California Polytechnic State University, Jan. 1996, 69 pages.
Dassen et al. "Design and testing of a low self-noise aerodynamic microphone forebody," American Institute of Aeronautics and Astronautics, Inc. May 1996, AIAA Paper 96-1711.

\* cited by examiner

ACOUSTIC BASED DETECTION AND AVOIDANCE FOR AIRCRAFT

CROSS-REFERENCE TO RELATED APPLICATIONS

This application claims priority to and the benefit of U.S. Provisional Patent Application No. 63/082,838 filed Sep. 24, 2020 entitled "ACOUSTIC BASED DETECTION AND AVOIDANCE FOR AIRCRAFT", U.S. Provisional Patent Application No. 62/955,946 filed Dec. 31, 2019 entitled "UNMANNED AIRCRAFT SYSTEM WITH MICROPHONE ARRAY", U.S. Provisional Patent Application No. 62/984,266 filed Mar. 2, 2020 entitled "UNMANNED AIRCRAFT SYSTEM WITH MICROPHONE ARRAY", and U.S. Provisional Patent Application No. 63/021,633 filed May 7, 2020 entitled "UNMANNED AIRCRAFT SYSTEM WITH MICROPHONE ARRAY", the entire disclosures of which are incorporated herein in their entirety by reference.

BACKGROUND

Conventional aircraft detection systems, such as radar, may be difficult or cost prohibitive to incorporate into smaller aircraft, such as unmanned aircraft. Further, regulations may require unmanned aircraft to maintain a spherical detection zone, detecting other aircraft in every direction relative to the aircraft. As conventional aircraft detection systems may not be developed for such detection, implementing conventional systems for spherical detection may be technically complex and expensive.

Conventional aircraft, including commercial aircraft and general aviation aircraft, follow established airspace rules to avoid collision with other aircraft. For example, in general, each aircraft is responsible for the airspace in front of the aircraft. In some airspaces, unmanned aerial vehicles (UAVs) may be required to maintain spherical coverage, meaning that the UAV must monitor airspace in each direction for intruding aircraft. Further, UAVs may be responsible for moving out of the way of intruding aircraft, so that other aircraft do not encounter UAVs during flight. Conventional aircraft detection systems, such as radar, may be optimized for monitoring the area in front of an aircraft such that detection may be poor for obstructions or objects close to the ground, such as hills. While such systems may be altered to provide spherical coverage, a system providing such coverage may be prohibitively heavy relative to a UAV. Further, conventional detection systems may have difficulty with long-range detection, which gives a UAV less time to detect other aircraft and alter its flight path to avoid other aircraft.

SUMMARY

An audio signal received at audio sensors of an aircraft is analyzed to determine directional information for a source of the audio signal. A location of the source of the audio signal is determined based on the directional information.

One or more non-transitory computer readable media may be encoded with instructions which, when executed by one or more processors of an acoustic aircraft detection system, cause the aircraft detection system to analyze an audio signal received by the acoustic aircraft detection system to determine directional information for a source of the audio signal and generate an estimation for a location of the source of the audio signal based on the directional information.

A multichannel audio signal is received at an acoustic detection system of an aircraft. A determination is made that the multichannel audio signal is associated with an intruding aircraft based on the multichannel audio signal. An initial maneuver is commanded for the aircraft.

An unmanned aerial vehicle (UAV) includes a plurality of acoustic sensors connected to the UAV and an acoustic detection system comprising one or more processors. The acoustic aircraft detection system analyzes audio signal received by the plurality of acoustic sensors to generate an estimation in a three dimensional space of an intruding aircraft relative to the UAV.

Additional embodiments and features are set forth in part in the description that follows, and will become apparent to those skilled in the art upon examination of the specification and may be learned by the practice of the disclosed subject matter. A further understanding of the nature and advantages of the present disclosure may be realized by reference to the remaining portions of the specification and the drawings, which form a part of this disclosure. One of skill in the art will understand that each of the various aspects and features of the disclosure may advantageously be used separately in some instances, or in combination with other aspects and features of the disclosure in other instances.

BRIEF DESCRIPTION OF THE DRAWINGS

The description will be more fully understood with reference to the following figures in which components are not drawn to scale, which are presented as various examples of the present disclosure and should not be construed as a complete recitation of the scope of the disclosure, characterized in that.

DETAILED DESCRIPTION

Figure 1A:
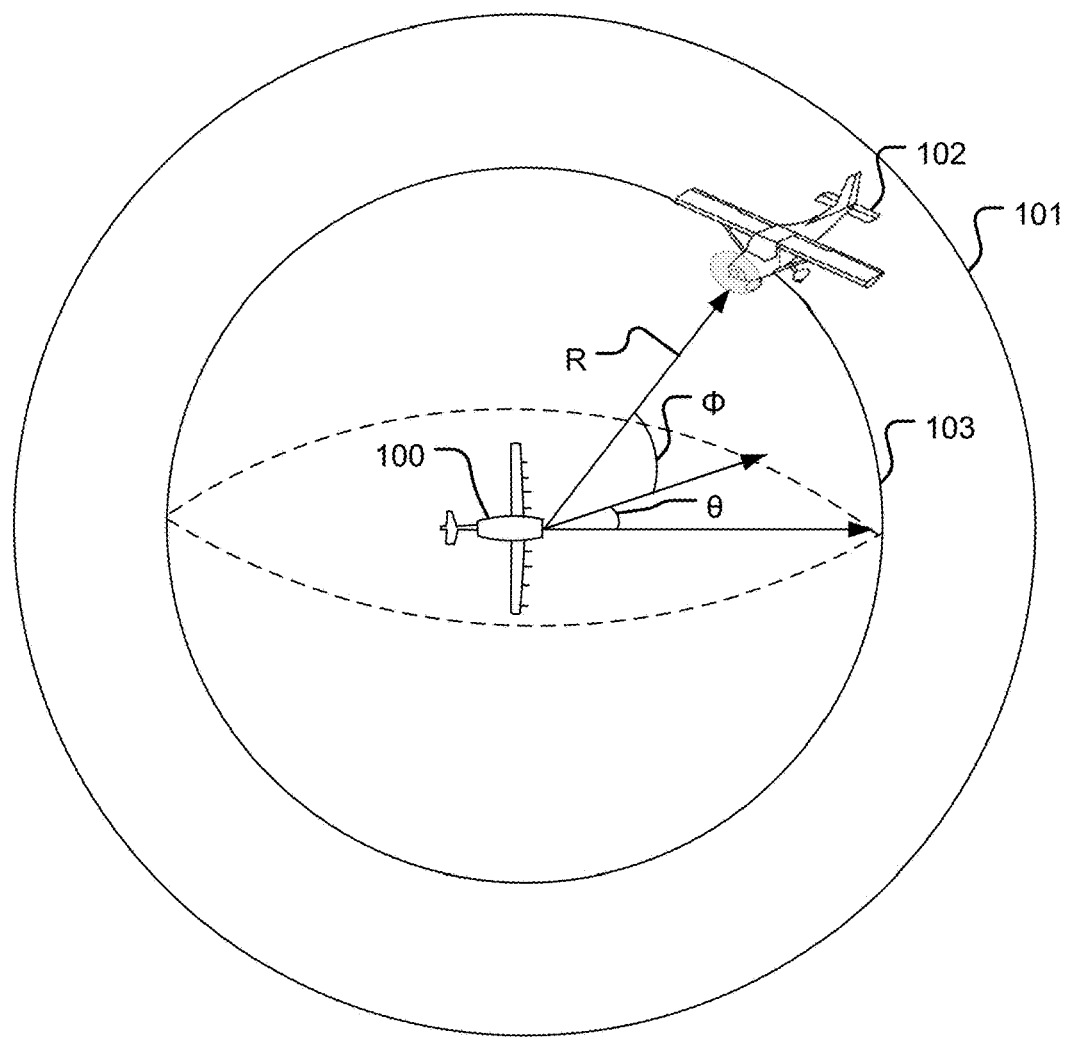
FIG. 1A illustrates an example aircraft and an intruder.

Audio based aircraft detection systems may provide an alternative to conventional detection systems for aircraft, especially those where conventional detection systems, such as radar, may be cost prohibitive or impractical to include, e.g., UAVs and other small aircraft. An audio based system may more readily provide spherical coverage without additional sensors facing in specific directions through the use of omnidirectional microphone, but in other instances, directional microphones may be used. For example, directional microphones may, in some implementations, be used in combination with omnidirectional microphones to gather additional information (e.g., to resolve front/back ambiguity). The audio based system can distinguish between noise produced by intruders, such as other aircraft, and noise produced by the aircraft's own engines (or flight system), distinguish between noise produced by intruders and natural sources (e.g., wind or weather noise), and determine directionality of sound (e.g., provide a location estimation of the intruder relative to the aircraft).

In one embodiment, the detection and avoidance (DAA) system uses an array of audio sensors to sense location of intruder in multiple directions relative to an aircraft, e.g., 360 degrees. Audio signals generated by intruders may be differentiated from, for example wind noise or noise from the aircraft, by comparing received audio signals to known other aircraft signals and rejecting signals assumed to not be associated with other aircraft, such as broadband signals (e.g., wind), non-directional signals, and near-field signals (e.g., noises from the aircraft's own engine). When an intruder signal is detected (i.e., presence of an intruder is detected) the DAA system determines location information for the intruder. For example, using the distance between the audio sensors on the subject aircraft and characteristics of the received intruder signal, the DAA system may calculate the azimuth of the intruder relative to the aircraft and estimate a relative location of the intruder. In some implementations, the system may analyze changes in the intruder signal as the aircraft moves relative to the intruder to determine the range and elevation of the intruder relative to the aircraft. It should be noted that although examples herein may discuss a single intruder, in some instances, there may be multiple intruders or sound sources. In these instances, the system may be configured to detect and estimate the location of two or more intruders and avoid each intruder as needed.

Using the estimated position of the intruder, the DAA system may utilize maneuvers or changes in a flight pattern for the aircraft to receive additional information about the intruder and/or avoid the intruder, where the avoidance may be based on avoiding a collision and/or maintaining a predetermined threshold or distance relative to the aircraft. For example, the DAA system may be selected to maintain a distance separation, e.g., 2,000 feet, between the subject aircraft and intruders, such as intruding aircraft, and the flight pattern updates are selected to maintain such distance, as well as avoid a collision.

The DAA system may also be selected to maintain a clear zone (e.g., a spherical zone with a radius of 2,000 feet) around the subject aircraft. For example, rather than attempting to "avoid" an intruder, the DAA system may attempt to maintain a free or unobstructed volume, such as a sphere, or space. In these instances, the DAA system may generate flight path changes or maneuvers based on estimated intruder locations that are set to maintain the free airspace distance, rather than avoid a collision with the intruder and the UAV. To maintain a clear zone, the DAA system may detect an intruder and determine the general location of the intruder relative to the airspace and distancing. In the event of multiple intruders, intruders may be distinguished based on different locations relative to the subject aircraft, differences between audio signals generated by the intruders (e.g., different frequency bands), and other sound source separation techniques.

Figure 1B:
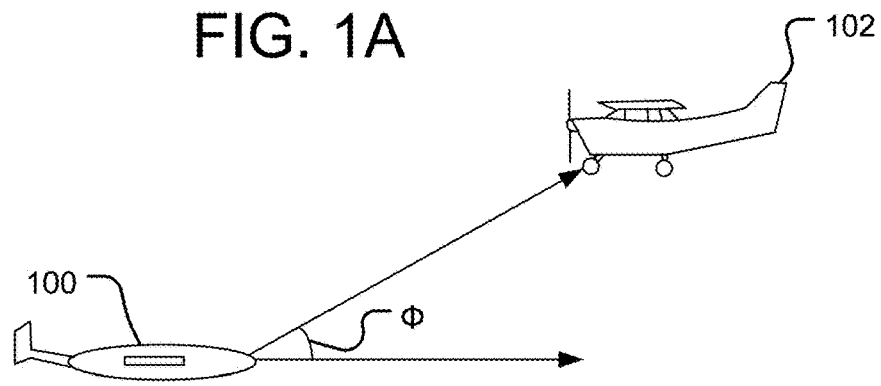
FIG. 1B illustrates an example aircraft and an intruder aircraft.

FIG. 1A is a top perspective view of a relationship between an aircraft 100 using acoustic based DAA and an intruder 102. FIG. 1B is an example of the aircraft 100 and the intruder 102 as viewed from a side elevation. As shown in FIG. 1A, the spatial relationship between the aircraft 100 and the intruder 102 may be defined in terms of azimuth θ, elevation angle Φ, and range R. With reference to the aircraft 100 and the intruder 102, azimuth θ measures the angle between the aircraft 100 and the intruder 102 from the perspective of the aircraft 100, where the angle θ is projected on a reference plane (shown in broken lines) parallel to the horizon. Elevation Φ is the angle between the aircraft 100 and the intruder 102 from the perspective of the aircraft 100, where the angle Φ is projected on a reference plane perpendicular to the horizon. Range R is the radial distance between the aircraft 100 and the intruder 102. The DAA system may allow the aircraft 100 to detect other aircraft within a spherical detection zone 101 (or other relevant detection area) such that the aircraft 100 can keep a spherical avoidance zone 103 clear of other intruders.

The DAA system may be used to determine whether an intruder is within the detection zone 101 of the aircraft 100 and to determine location information for the intruder, such as the azimuth θ, elevation angle Φ, and/or range R of an intruder 102. Further, in some implementations, the DAA system may select maneuvers for the aircraft 100 to keep the avoidance zone 103 clear of intruders, including the intruder 102.

The aircraft 100 may be provided with an audio array, including multiple audio sensors, such as omnidirectional microphones, mounted on the aircraft 100. For example, the audio array may be implemented by the audio array described in U.S. Patent Application No. 63/082,869, which is hereby incorporated herein in its entirety for all purposes. When a signal is received at the audio array, the DAA system 105 may determine whether the signal is likely associated with an aircraft by analyzing variations of a signal across sensors in the array. For example, where a signal is the same across all sensors and does not vary over time, the signal is likely either not directional and/or is associated with a close-range signal and is therefore not associated with an intruder. For example, noise from wind or motors of the aircraft 100 would be less likely to vary periodically and would likely result in a similar signal across various sensors. Where the signal is likely from an intruder, the DAA system may estimate the azimuth θ of the intruder 102 by analyzing variations in the audio signal across sensors and the distance between sensors.

To estimate the elevation angle Φ and range R of the intruder 102, the DAA system may observe changes in the audio signal as the aircraft 100 moves relative to the intruder 102. In some implementations, specific maneuvers may be used to gather additional data, e.g., force changes in the signal characteristics by changing positioning of the aircraft 100 to the intruder 102. For example, the aircraft 100 may rotate along its roll axis while the DAA system analyzes the audio signal to generate an estimation of the elevation angle Φ and range R of the intruder 102.

The azimuth θ, elevation angle Φ, and/or range R provide a state estimation of the intruder 102, which may be used by systems of the aircraft 100 to maneuver away from the intruder 102 or to otherwise update a flight path to maintain a desired separation between the aircraft 100 and the intruder 102. In some implementations, the DAA system may continually generate state estimations for the intruder 102 to track the intruder 102. Further, the DAA system may incorporate data from additional sensing modalities (e.g., image data, radar, light detection and ranging (LiDAR), or automatic dependent surveillance-broadcast (ADS-B) sensors).

Figure 2:
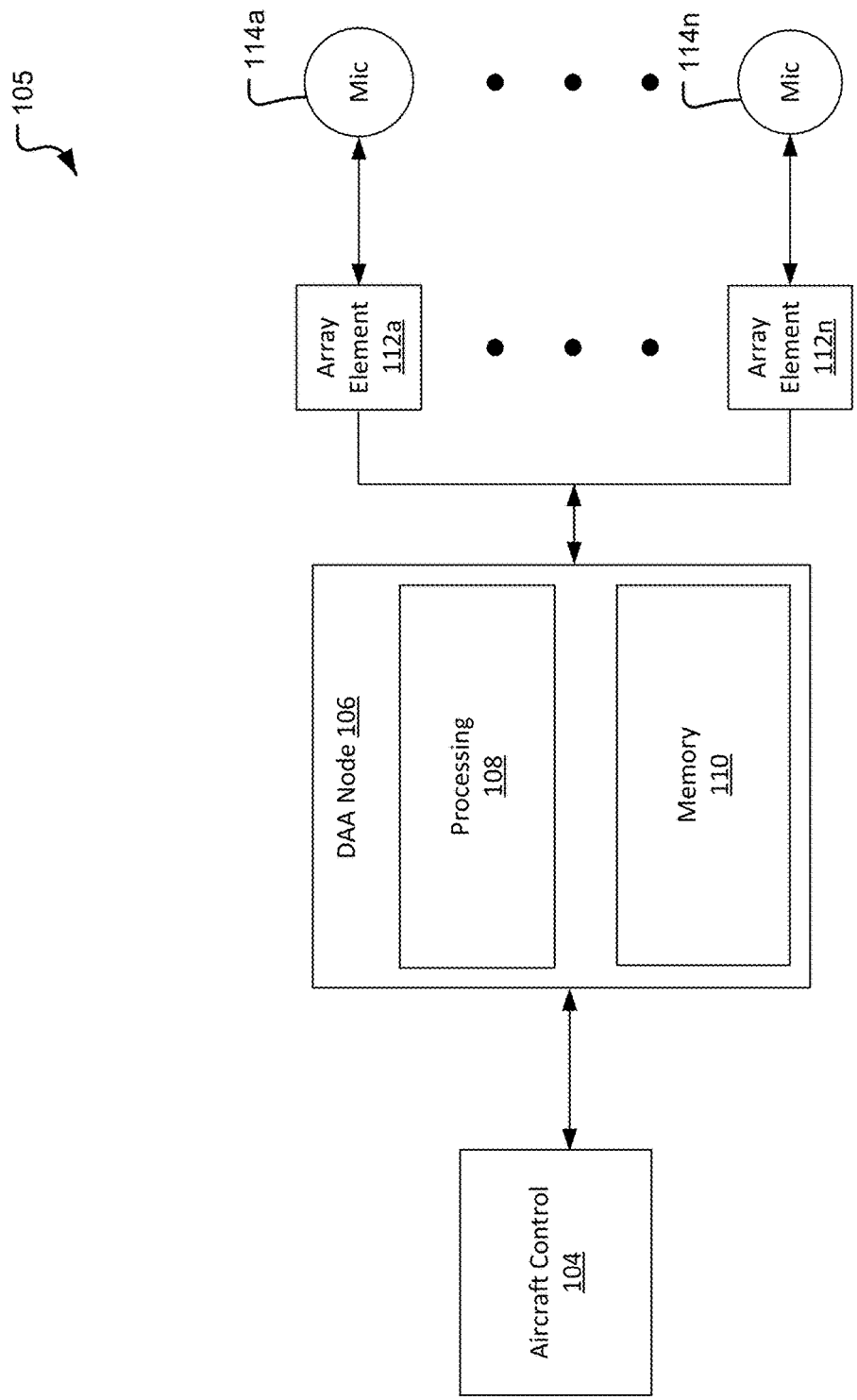
FIG. 2 is a schematic diagram of an example acoustic based detection and avoidance system in accordance with particular embodiments.

FIG. 2 shows example hardware diagram used to implement a DAA system. A DAA node 106 includes processing 108 and memory 110 that may analyze audio signals received at microphones 114a-n. Array elements 112a-n may format or process signals received by microphones 114a-n before the signals are provided to the DAA node 106 for processing and analysis. The DAA node 106 may also communicate with aircraft control 104 such that the DAA node 106 can command the aircraft 100 to perform a variety of maneuvers.

Microphones 114a-n may be mounted on the aircraft 100 at locations selected to minimize noise perceived by the microphones 114a-n. For example, in some implementations, the microphones 114a-n may be mounted on probes connected or attached to wings of the aircraft 100. Additional microphones may be mounted elsewhere on the aircraft 100. In various implementations, the microphones 114a-n may be omnidirectional microphones or may be implemented by a combination of omnidirectional microphones, directional, and/or other microphones. The microphones 114a-n may be implemented to provide a digital signal or an analog signal. Collectively, the audio signals collected at the microphones 114a-n provide a multichannel audio signal to the DAA system.

Array elements 112a-n may be implemented by various hardware capable of capturing and processing signals from the microphones 114a-n. For example, in one implementation, the array elements 112a-n may be implemented using programmable logic to digitize analog audio signals collected at the microphones 114a-n. In other implementations, array elements 112a-n may be implemented using other types of hardware including microcontrollers, system on chip (SOC) hardware, and other types of compute resources.

DAA node 106 includes processing 108 and memory 110. Memory 110 may be implemented using any combination of volatile and non-volatile memory. Processing 108 may include one or more processors operating individually or in combination and may include, for example, programmable logic and other processors. In various implementations, the DAA node 106 may be implemented by SOC hardware, a microcontroller, or various compute resources. The DAA node 106 may also be implemented by combinations of various types of compute resources. For example, in one implementation, the DAA node 106 includes a controller board and a microcontroller.

Aircraft control 104 may include various systems to control the aircraft 100 and to communicate with ground station and other aircraft. For example, aircraft control 104 may include transmitting and receiving hardware for communications via very high frequency (VHF) radio bands, satellite communications, cellular communications, or communications via additional radiofrequency bands. Aircraft control 104 may include various components and modules responsible for generating a flight plan for the aircraft 100, actuator control, propulsion control, payload management, and safety system management, among others. The aircraft control 104 may be implemented by any number of hardware components including SOC hardware, various processors, controllers, and programmable logic.

Various hardware components of the DAA system may be communicatively connected by communications buses, universal serial bus (USB) connections, or other communicative connections.

Figure 3:
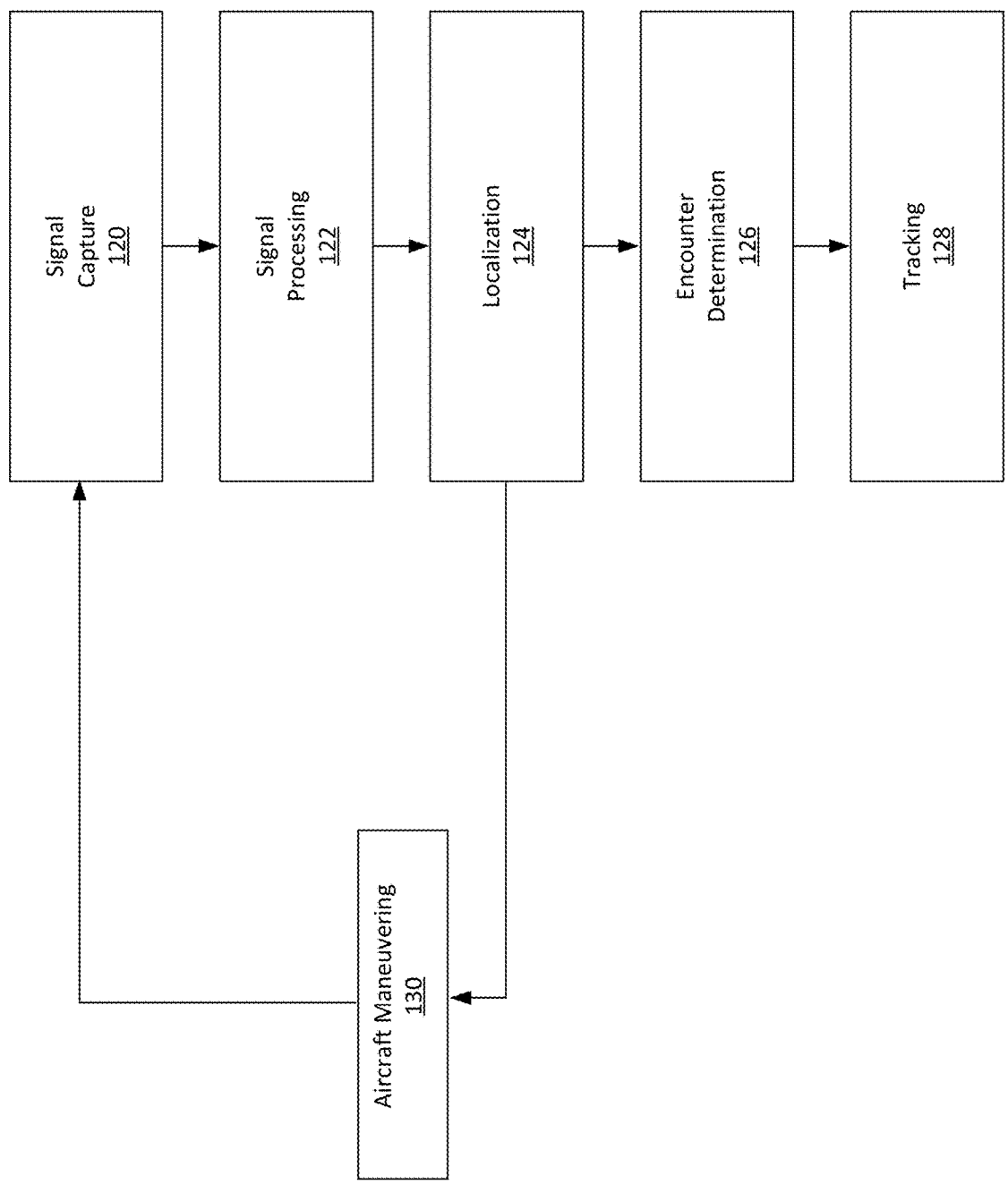
FIG. 3 is a block diagram of an example acoustic based detection and avoidance system in accordance with particular embodiments.

FIG. 3 shows a block diagram of an example DAA system. The blocks of the example DAA system may be implemented using a variety of algorithms, models, programming, or combinations of any number of algorithms, models, and other programming. In some implementations, instructions corresponding to the blocks of the DAA system may be executed using the same processor (e.g., DAA node 106). In other implementations, some instructions may be executed by processors on different boards or by different processors on a shared board. For example, instructions for signal capture 120 and signal processing 122 may be executed by processors at array elements 112a-112n, while localization 124, encounter determination 126, and tracking 128 may be executed using processing resources 108 at the DAA node 106. Further, instructions for one block of the DAA system may be executed at multiple locations. For example, initial signal processing 122 instructions may be executed at array elements 112a-112n, while further signal processing 122 may occur at the DAA node 106.

One or more blocks of the example DAA system may be implemented using machine learning models, including deep learning networks. In some implementations, several blocks of the DAA system may be implemented by a single model or using combinations of models that work cooperatively. For example, in one implementation localization 124 and encounter determination 126 may be implemented by a shared deep neural network.

Instructions for signal capture 120 may include algorithms to timestamp received audio signals and align audio signals across channels to generate a multichannel audio signal. In some implementations, signal capture 120 may include converting analog signals to digital signals for processing. Signal capture 120 may occur at array elements 112a-n, the DAA node 106, or a combination of the array elements 112a-n and the DAA node 106. For example, in some implementations, incoming analog signals may be converted to digital signals and time stamped at respective array elements 112a-n and the digital signals may be aligned to form a multichannel audio signal at the DAA node 106.

Instructions for signal processing 122 may include algorithms and machine learning models for transforming a multichannel audio signal. Which algorithms or models are included in signal processing 122 may be dependent upon methods implemented by the DAA system to analyze the multichannel audio signal. For example, in one implementation, the DAA system includes a model for localization that receives three-dimensional frequency domain data as input and signal processing 122 includes a fast Fourier transform (FFT) algorithm to transform the multichannel audio signal to the frequency domain. In another implementation, signal processing 122 may occur within a deep neural network implemented by the DAA system. In some implementations, signal processing 122 may include filtering out extraneous noise from the multichannel audio signal. For example, signal processing 122 may identify broadband wind signals and filter those signals from the multichannel audio signal.

Instructions for localization 124 may be implemented using various combinations of algorithms and machine learning models depending on the localization method implemented by the DAA system. For example, localization 124 may include algorithms for beamforming of a multichannel audio signal and additional algorithms for analyzing the beamformed audio signal to determine directionality. In another example implementation, localization 124 may be implemented using multiple binary classifiers representing bins of azimuth angles to generate an estimation of azimuth.

In yet another example implementation, localization 124 may be implemented using a deep neural network generated using labeled multichannel audio and directional data. Localization 124 may also include machine learning models, algorithms, or combinations to determine range and elevation based on audio signals gathered during motion of the aircraft 100. Further, in some implementations, localization 124 may be implemented using models that combine multichannel audio signals with signals from additional sensing modalities (e.g., LiDAR, radar, and ADS-B) to generate estimations of location of an intruder aircraft 102.

Aircraft maneuvering 130 may be implemented to provide instructions for specific aircraft maneuvers or changes to the flight plan for the aircraft 100 to the aircraft control 104. Accordingly, aircraft maneuvering may include instructions to various components of the aircraft control 104 (e.g., instructions for actuation control and propulsion control) to initiate various aircraft maneuvers. In some implementations, the instructions provided to the aircraft control 104 by aircraft maneuvering 130 may be dependent on estimations generated by localization 124.

Encounter determination 126 may be a module making an initial determination of whether a received audio signal is associated with one or more likely intruders. For example, an encounter may be determined when a sound source indicates the presence of one or more intruders within a spatial area surrounding the UAV, within a distance relative to the UAV, or other threshold selected by the system. In the method, the encounter determination 126 may be implemented by various combinations of algorithms and/or machine learning models to generate a likelihood that a received multichannel audio signal is associated with an intruder 102. In some implementations, encounter determination 126 may be implemented using a deep neural network generated using multichannel audio signals from known aircraft. In some implementations, the deep neural network may be the same deep neural network used for localization 124. In another example implementation, encounter determination 126 is implemented using a classifier, which may be, for example, a random forest classifier or a binary classifier. In yet another implementation, encounter determination 126 may be implemented using algorithms and models to compare a received multichannel audio signal to known audio signals associated with aircraft. For example, the blade pass frequencies of aircraft may be utilized to generate multiple filters showing frequencies associated with aircraft. The multichannel audio signal (or a representation of the multichannel audio signal generated by signal processing 122) may be cross correlated or otherwise compared to the filters to determine whether the signal is associated with an aircraft. In some implementations, encounter determination 126 may also include models and algorithms to identify a specific type of aircraft during the cross-correlation process.

Tracking 128 or location identification may be implemented by data structures, algorithms, or a combination thereof to track or otherwise determine a location of an intruder 102, or multiple intruders, over time based on state estimations from localization 124. In some implementations, tracking 128 may be implemented including algorithms, models, or various combinations of algorithms and models to determine whether a received state estimation belongs to an already existing track or whether a new track should be created for a state estimation. For example, a data point may be associated to a track or location using a Hungarian algorithm and the maintenance and updating of a track or a location may include application of one or more Bayesian filters and Monte-Carlo methods. In some examples, a prior track history may be updating based on new information using iterative smoothing and mapping (iSAM2). In other examples, a "track" or location update may be determined and updated using different filters and algorithms as desired, as well as may include a combination of one or more methods, such as utilizing probabilistic tracking (e.g., Bayesian filtering, Kalman filtering, Monte-Carlo methods) to determine a source location after some aspects have been determined by ML or deep learning models. The various blocks of the DAA system may be, in some implementations, implemented by common models. Generally, the various blocks are communicatively connected and cooperatively process and analyze multichannel audio data.

Figure 4:
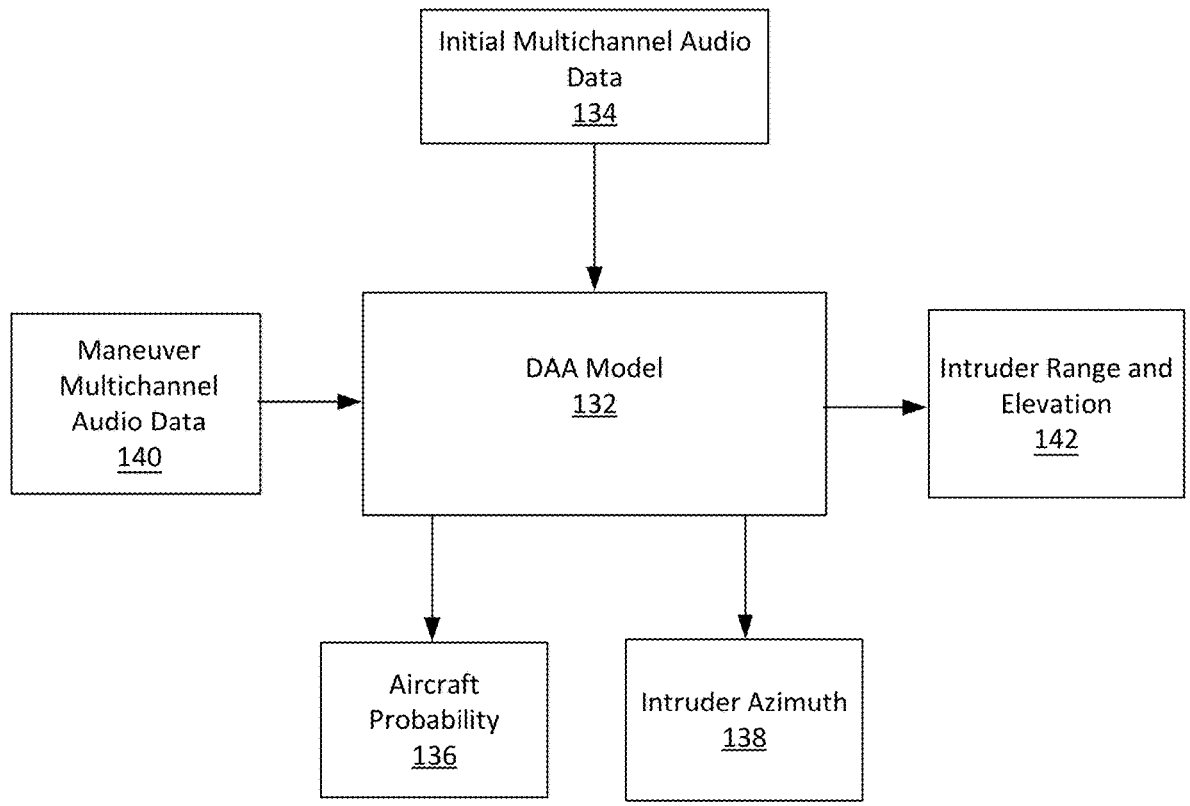
FIG. 4 is a block diagram of an example model of an acoustic based detection and avoidance system.

FIG. 4 shows an example DAA model 132, including inputs received by the DAA model 132 and outputs generated by the DAA model 132. The DAA model 132 may be implemented as machine readable instructions located at memory 110 of the DAA node 106 and executed by processing 108 of the DAA node 106. The DAA model 132 may be used to implement various blocks of the example DAA system described in FIG. 3. For example, in one implementation, the DAA model 132 is used to implement both localization 124 and encounter determination 126. In other implementations, the DAA model 132 may also include signal processing 122, aircraft maneuvering 130, and some portions of tracking 128. The DAA model 132 may receive initial multichannel audio data 134 and generate an aircraft probability 136 and an intruder azimuth 138 based on the initial multichannel audio data 134. The DAA model 132 may also receive maneuver multichannel audio data 140 and generate an intruder range and elevation 142 based on the maneuver multichannel audio data 140.

The DAA model 132 may be implemented using a variety of machine learning models, including combinations of several machine learning models, and/or a combination of machine learning models and probabilistic filtering. For example, in one implementation, the DAA model 132 may be implemented using a deep learning model, such as a deep neural network or recurrent neural network. In other implementations, the DAA model 132 may include one or more of or a combination of a random forest model regressor or binary classifier, or multiple binary classifiers, or similar classifiers. Other types of machine learning models or combinations of machine learning models may be used to implement the DAA model 132 and the type of model used to implement the DAA model may be partially dependent on the type of data used as input to the DAA model 132. For example, where the initial multichannel audio data 134 is provided in the time domain, the DAA model 132 may be implemented by a recurrent neural network. In other implementations, the initial multichannel audio data 134 may be formatted as image data in the frequency domain and the DAA model 132 may be implemented by a convolutional neural network. For example, image data may have multiple channels representing multiple frequency transformations such that frequencies with harmonic relationships relative to each other are collocated in the same pixel region on different channels. This type of image data facilitates a convolutional filter to discover harmonic relationships when considering a limited subset of pixels. In some implementations, a deep neural network (e.g., a recurrent neural network or convolutional neural network or transformer) may be combined with various types of classifiers or other machine learning models to implement the DAA model 132.

The initial multichannel audio data 134 may, in some implementations, be provided as input to the DAA model 132 with little or no processing after being collected by the audio array. For example, the initial multichannel audio data 134 may be provided to the DAA model 132 one-dimensional time domain data for each of the channels in the initial multichannel audio signal. In other implementations, the initial multichannel audio data 134 may be transformed to the frequency domain before being provided to the DAA model 132. Two-dimensional frequency domain data may include frequency and phase data for each of the channels included in the multichannel audio data 134. Three-dimensional frequency domain data may include time, frequency, and phase data for the multichannel audio signal. Other pre-processed data may be provided as the initial multichannel audio data 134, such as a beamformed spectrogram including time, frequency, and signal intensity or a feature vector generated using a harmonic kernel bank. In some implementations, other data sources, such has motor telemetry data from other sensors on the aircraft, may be pre-processed and layered with the multichannel audio data to help the models determine which sounds are generated by the aircraft and which sounds originate elsewhere.

The aircraft probability 136 may be provided as a probability that the signal captured in the initial multichannel audio data 134 is associated with an intruder. In some implementations, the aircraft probability 136 may include a decision (yes or no) with a confidence interval or probability relating to the decision. In other implementations, the aircraft probability 136 may include probabilities that the audio signal is associated with different classes or types of aircraft. For example, the aircraft probability 136 may include a probability that the signal is associated with a general aviation aircraft, a helicopter, or the like. As another example, the audio signal may be characterized as being associated with a more specific range of aircraft, e.g., heavy jet, light jet, narrow body aircraft, or the like. The classification may assist the system in making decisions regarding maneuvers to either avoid the intruder and/or maintain a free airspace, since information, such as the expected flight elevation, velocity ranges, and the like, may be extracted and utilized by the system based on the classification of the type of aircraft. In some instances, the probability may include an assessment that the probability is associated with an aircraft (or may be framed in the opposite manner, that the signal is not an aircraft).

The intruder azimuth 138 may be presented as an angle with a confidence interval or may include probabilities for multiple ranges of angles. For example, in one implementation each angle relative to the aircraft 100 may be included in a bin of angles. Various numbers of bins may be used. In one example, 64 bins are included in the analysis, where each bin includes a range of angles of 5.625°. For example, a bin included in the analysis includes angles from 0-5.625° and another bin includes angles from 354.375-360°. The returned intruder azimuth 138 may include a probability that the intruder azimuth is within each of the candidate bins. The returned intruder azimuth may also include probabilities for a certain number of bins. For example, probabilities may be returned for the five bins with the highest probability of including the intruder azimuth 138. In some implementations, the intruder azimuth 138 may be calculated only if the aircraft probability 136 indicates a strong likelihood that the multichannel audio signal is associated with an intruder 102.

Where the aircraft probability 136 returns showing a likelihood that the initial multichannel audio data 134 is associated with an intruder 102 and the intruder azimuth 138 is determined, the DAA system may instruct various maneuvers to collect maneuver multichannel audio data 140. The maneuver multichannel audio data 140 is generally multichannel audio data collected during a known maneuver of the aircraft 100, during controlled movement of sensors (e.g., microphones 114a-n), or combinations of various types of known movement. Accordingly, the maneuver multichannel audio data 140 may be represented in the various forms described with respect to the initial multichannel audio data 134 and may also include information (e.g., time of maneuver, amplitude, angle, etc.) regarding the maneuver of the aircraft 100.

The intruder range and elevation 142 may be generated by the DAA model 132 based on the maneuver multichannel audio data 140 and may be presented in similar representations as those discussed with respect to the intruder azimuth 138. For example, the intruder elevation may be represented by several bins of angles with probabilities that the intruder elevation is included in each bin. The intruder elevation may also be represented by an estimated angle and a confidence interval corresponding to the estimated angle. Similarly, the intruder range may be represented as an estimated range accompanied with a confidence interval.

A combination of the intruder azimuth 138 and intruder range and elevation 142 may be used to generate a state estimation or location estimation for the intruder aircraft 102 in three-dimensional space. In some implementations, as data is continually collected and processed by the DAA system, multiple state estimations may be aggregated to track and intruder aircraft 102 with respect to the aircraft 100. Such tracks may be used, in some implementations, to select avoidance maneuvers for the aircraft 100.

In various implementations, the state estimation or location estimation may estimate the location using an audio signal (e.g., from the DAA system) and a second signal. The second signal may be another audio signal collected at a different point in time or a signal collected using a different sensor modality, such as ADS-B In, LiDAR, radar, image data or vision-based signal, GPS, or other sensor modalities. For example, in one implementation, an audio signal may be used in conjunction with a vision-based signal (e.g., a camera) to generate a location estimation. In this example, the audio signal may provide a rough approximation of location (e.g., there is likely an intruder on the left side of the aircraft), while a vision-based signal may refine an estimation generated from the audio signal. In other words, the first signal may be used to determine general location information that may be detected from a farther distance and the second signal may be used to determine more accurate or sensitive location information, that may be detected from a closer distance to the source. In these instances, the first signal may be used to determine when to actuate sensors for the second signal, e.g., once the first signal has been used to detect an intruder within a particular distance threshold of the aircraft, the system can then actuate the second sensor and detect the second sensor signal. Further, in some implementations, three or more different signals (differing in collection time, sensing modality, or both collection time and sensing modality) may be used to generate a location estimation.

Figure 5:
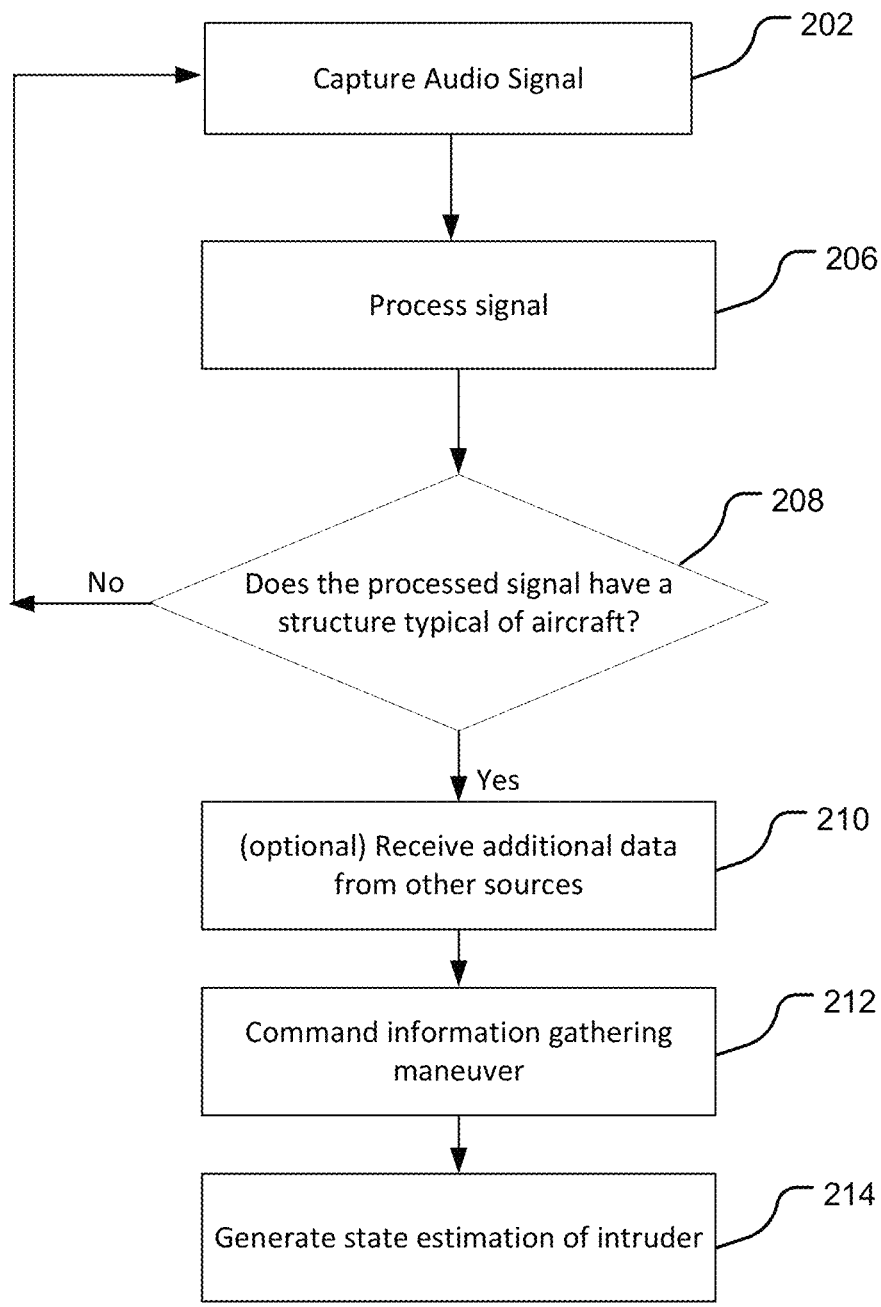
FIG. 5 is a flow diagram of example steps for generating a state estimation of an intruder based on a captured audio signal.

FIG. 5 is a flow diagram of example steps for generating a state estimation of an intruder based on a captured or otherwise detected audio signal. A capturing operation 202 captures an audio signal. For example, one or more of the microphones 114a-n may detect audio signals during the capturing operation 202. The capturing operation 202 may detect audio signals around the aircraft 100, including, in some examples, audio signals not associated with intruders. Further, in some implementations, other sensing modalities may capture signals during the capturing operation 202. For example, ADS-B receivers or LiDAR detectors may capture signals as the microphones 114a-n capture audio signals.

A processing operation 206 processes the signal to format the signal for further analysis, if needed. The processing operation may be implemented by the signal processing block 122 of the DAA system. In some implementations, some portions of the processing operation 206 may be performed at the localization block 124 of the DAA system. Accordingly, portions of the processing operation 206 may be performed by the DAA model 132.

The processing operation 206 may, in various implementations, include transforming an analog signal to a digital signal, time aligning the multichannel audio signal, domain transforming the signal, beamforming the signal, or otherwise adjusting the signal to optimize the signal to noise ratio (SNR) of the signal. For example, in one implementation, the processing operation 206 time stamps the multichannel audio signal. In another implementation, the processing operation 206 transforms the multichannel audio signal to the frequency domain, resulting in either a two dimensional frequency domain signal for each channel of the multichannel audio signal or a three dimensional frequency domain signal representing the multichannel audio signal. The processing operation 206 may use, for example, an FFT algorithm to transform the signal. The processing operation 206 may also implement a beamforming algorithm to generate a beamformed spectrogram representing the multichannel audio signal. The processing operation 206 may, accordingly, generate initial data 134 provided to the DAA model 132, in some implementations.

The processing operation 206 may determine whether the captured signal is directional and/or distanced from the aircraft (e.g., not a near-field signal). The directionality determination may be done implicitly (e.g., via beamforming) or explicitly. In some examples, the DAA system 105 may attempt to time align the multichannel audio signal. For example, where a signal is not periodic (e.g., does not vary in a pattern over time), the signal will likely not time align across multiple channels. Where the multichannel audio signal is capable of being time aligned, the signal is likely coherent and directional. In instances where the multichannel audio signal is not capable of being time aligned across channels, the signal can be assumed to be incoherent and not directional. An incoherent or non-directional signal is typically one that is not produced by one localized sound source (e.g., another aircraft) and may instead be attributed to other sources, such as wind or weather.

In some implementations, a determination of whether the captured signal is directional may be made implicitly during the operation 208. For example, all incoming signals may be processed during operation 206 and a determination of directionality may be part of the determination of whether the processed signal has a structure typical of aircraft. For example, directionality may be determined as part of the determination of whether the processed signal has a structure typical of an aircraft. For example, a beamformed signal that is non-directional may not correlate to harmonic kernel filters mimicking the signals expected from aircraft. Similarly, a near-range audio signal many not correlate to harmonic kernel filters designed to mimic farther range audio signals.

In some implementations, an explicit determination of directionality may be made by, for example, looking for specific characteristics of a processed audio signal specifically to determine directionality. For example, the DAA system may reject broadband signals as non-directional. The system may also look for other characteristics of directional signals, such as periodicity, to determine directionality explicitly.

In the operation 208, the processed signal is analyzed to determine whether the processed signal has a structure typical of an aircraft. The operation 208 may be part of the encounter determination 126 of the DAA system. In some implementations, the DAA model 132 may analyze the processed signal based on the initial multichannel audio data 134. During the operation 208, the DAA model 132 may compare the initial multichannel audio data 134 to multichannel audio data known to correspond to aircraft. In other implementations, the operation 208 may include cross-correlating the processed multichannel audio data to a bank of filters, which may be harmonic kernel filters. Harmonic kernel filters may represent the signal expected from an aircraft based on the blade pass frequency of the aircraft. Generally, harmonic kernels may be generated for a range of aircraft expected to be encountered. For example, harmonic kernels may be generated for specific aircraft (e.g., a specific make and model) and/or may be generated for a class of aircraft (e.g., aircraft that use propellers, heavy jets, or the like). In instances where the filters may be generic across a range or class of aircraft, the filters can be more broadly applicable to possible audio sources as compared to more specific filters. That said, with more specific filters that more closely match with the exact type of aircraft, the assumptions and inputs may be more relevant to the audio signal source.

The harmonic kernel filters may include a base frequency and multiple harmonic frequencies corresponding to the base frequency. Where the multichannel audio signal does not correlate to the bank of harmonic kernel filters, the operation208 may determine that the multichannel audio signal does not have a structure typical of an aircraft. Where the multichannel audio signal does strongly correlate with a harmonic kernel filter, the operation 208 may determine that the processed signal does have a structure typical of an aircraft. Correlation with a filter may be determined, for example, by image comparison, where an image representing the signal is compared to the filters, represented as images, to determine whether the signal resembles an expected idealized harmonic signal.

Where the processed signal does not have a structure typical of an aircraft, the method returns to the capturing operation 202. Where the processed signal does have a structure typical of an aircraft, an optional step 210 may receive additional data from other sources. For example, ADS-B In data from the aircraft 100, ground-based LiDAR data, or other data from ground or aircraft based sensors may be received during the optional step 210. Such data may be used, for example, by the DAA model 132 to generate a state estimation of the intruder 102. The state estimation may be used by the aircraft 100 to track the intruder over time or to determine a course of action for keeping the avoidance zone 103 clear of the intruder 102.

A commanding operation 212 commands a gathering maneuver, such as one that may be selected to gather more information and/or increase a distance or separation between the sound source and the aircraft 100. Where the operation 208 determines that the multichannel audio signal has a structure typical of an aircraft, the commanding operation 212 may command a maneuver to determine changes in the multichannel audio signal behavior as the aircraft 100 moves relative to the intruder 102. The criteria for determining whether the multichannel audio signal has a structure typical of an aircraft may be lower or otherwise different than criteria used for determination. For example, a maneuver may be initiated based on a suspicion that the multichannel audio signal belongs to an aircraft. Such maneuvers allow the DAA system to determine additional location information for the intruder, which may help to determine or refine estimations for azimuth, elevation, and range for the intruder 102, as well as increase a separation between the intruder 102 the aircraft 100. The commanding operation may be implemented at aircraft maneuvering 130, by communicating an information gathering maneuver from the DAA node 106 to aircraft control 104. As mentioned, in some implementations, the maneuver may be an avoidance maneuver, which moves the aircraft 100 to a location where a collision with another aircraft (including the intruder 102) is statistically less likely. For example, an avoidance maneuver may reduce the altitude of the aircraft 100 as encounters with other aircraft may be less likely at lower altitudes. In other implementations, the information gathering maneuver may be configured to generate information by moving in a specific axis. For example, a "wing wag" maneuver may move the wings of the aircraft 100 (and, accordingly the audio sensors) along a roll axis of the aircraft 100 to capture changes in the multichannel audio signal behavior during the wing wag maneuver. Other maneuvers, such as a roll or crab maneuver, may also be used as information gathering maneuvers. The information gathering maneuver may, in some implementations, include multiple individual maneuvers and may include very small or micro maneuvers.

A generating operation 214 generates a state estimation of the intruder. The state estimation of the intruder may include intruder characteristics, such as, but not limited to, the azimuth, elevation, velocity, range, and/or fundamental frequency of the intruder 102 relative to the aircraft 100. In some implementations, the state estimation may include only one or two of the above coordinates. The generating operation 214 may be based on data collected as a multichannel audio signal and may, in some implementations, incorporate additional data from other sensor modalities. Further, the generating operation 214 may occur in sub-operations. For example, in some implementations, the azimuth of the intruder 102 may be determined before the commanding operation 212 and the elevation and range of the intruder 102 may be determined after the commanding operation 212 by analyzing changes in the multichannel audio signal as the aircraft 100 executes an information gathering maneuver. The generating operation 214 may occur at localization 124 of the DAA system.

In some implementations, the generating operation 214 is carried out by the DAA model 132. In some implementations, the DAA model 132 may generate the state estimation based on maneuver multichannel audio data 140. In other implementations, the DAA model 132 may use initial multichannel audio data 134 to generate the intruder azimuth 138 and use maneuver multichannel audio data 140 generated in response to the commanding operation 212 to generate the intruder range and elevation 142. The DAA model 132 may determine the intruder azimuth 138 using, for example, a mean standard deviation to estimate the azimuth and a confidence interval for the estimation. The DAA model 132 may also generate an estimation of the azimuth based on known data used to train or generate the DAA model 132. In some implementations, this may include using multiple classifiers each representing a bin of angles to determine the probability that the azimuth of the intruder 102 is within a respective bin. In other implementations, the DAA model 132 may use additional or alternate approaches to calculate the intruder azimuth 138.

In some implementations, the azimuth may be determined using algorithms not included in the DAA model 132. For example, where the processing operation 206 generates a beamformed spectrogram representing the multichannel audio signal, the intruder azimuth may be determined by identifying the phase shift or angle bin (e.g., an angle bin on the beamforming source map) corresponding to the highest intensity signal. For example, the location on the spectrogram where the signal is highest in intensity (e.g., highest dB) correlates to a phase angle, which may be used to approximate the azimuth. Other algorithms may also use the multichannel audio signal and the geometry of the array (e.g., known distances between microphones 114a-n) to determine or estimate the intruder azimuth.

The intruder range and elevation 142 may be determined by the DAA model 132 using maneuver and multichannel audio data 140 generated responsive to the commanding operation 212. In some implementations, the DAA model 132 may compare the behavior of the signal during the information gathering maneuver to known data to estimate the intruder range and elevation 142 or by observing changes of magnitude of the signal during the information gathering maneuver. In other implementations, the DAA model 132 may use other methods to determine the intruder range and elevation 142 based on the maneuver multichannel audio data 140. For example, in some implementations, the geometry of the microphones may be changed by actuating the microphones during flight, which may generate data used by the DAA model 132. Actuation of the microphones by a known amount (e.g., a known displacement) or known variation, while measuring how the audio signal changes as a result of the displacement may provide additional data about the audio signal source including location, velocity, and the like. Further, in some implementations, the intruder range and elevation may be generated without use of the DAA model 132, using algorithms incorporating the changes in position of the various array elements as a result of the information gathering maneuver and the behavior of the multichannel audio signal at various channels responsive to the information gathering maneuver.

In some implementations, additional operations may use the state estimation generated by the generating operation 214 to track an intruder as it moves relative to the aircraft 100. Such tracking may be used to determine whether an initial avoidance maneuver was sufficient to avoid an intruder, whether the maneuver has kept the avoidance zone 103 of the aircraft 100 clear, what types of avoidance maneuvers are best for avoiding an intruder and/or keeping the avoidance zone 103 clear of intruders, and to refine estimations of the location of an intruder. In some implementations, the state estimation and tracks generated based on multiple state estimations may be transmitted to, for example, a ground control station for the aircraft 100.

Figure 6:
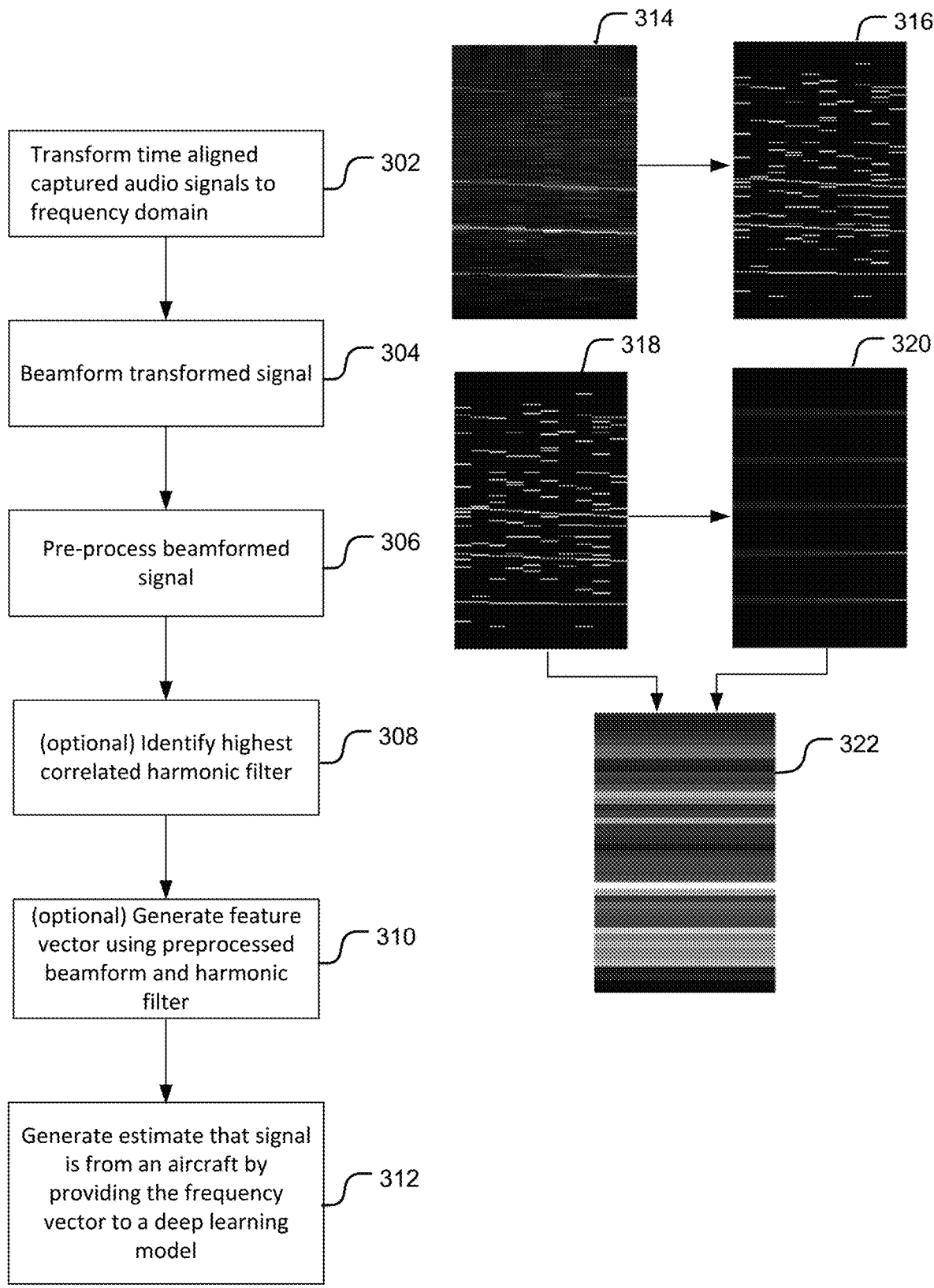
FIG. 6 is a flow diagram of example steps for encounter determination using an acoustic based detection and avoidance system.

FIG. 6 is a flow diagram of example steps for encounter determination using an detection and avoidance system. In some implementations, the operations described with respect to FIG. 6 may occur as part of the processing operation 206 and the operation 208 described above with respect to FIG. 5. In some implementations, some or all of the operations of FIG. 6 may be carried out using the DAA model 132. A transforming operation 302 transforms time aligned captured audio signals to the frequency domain. The transforming operation 302 may use, for example, a FFT algorithm to transfer time domain signals to frequency domain signals. In various implementations, the transforming operation 302 may produce two-dimensional frequency domain signals or three-dimensional frequency domain signals. A beamforming operation 304 beamforms the transformed signal. Various beamforming algorithms, such as minimum variance beamforming, may be used to generate a beamformed spectrogram from the transformed signal. The beamformed spectrogram generally shows a signal obtained by combining the signals received at the various channels of the array. The beamformed signal may, for example, use constructive interference between the various signals to strengthen the signal of interest (e.g., signals in frequencies associated with intruders). A generated spectrogram 314 may map frequency over time, where color variations indicate signal strength. For example, in the spectrogram 314, shown in greyscale, white color may correlate to a high strength or high intensity signal, while a black color correlates to no signal, and the shades of grey between the two indicate variations in strength. Other color schemes or computer readable elements may also be used in various implementations to indicate variations in strength or intensity of a signal.

A pre-processing operation 306 pre-processes the beamformed signal. For example, the pre-processing operation 306 may convert the spectrogram 314 to the processed signal 316. The pre-processing operation 306 may, for example, disregard signals at below a threshold intensity to simplify the spectrogram 314. For example, the processed signal 316 includes less minor variations by eliminating low intensity signals from the spectrogram 314, while retaining frequency signals of interest. In some implementations, the method may proceed directly from the pre-processing operation 306 to a generating operation 312. For example, where a deep learning model implements the DAA model 132, the optional operations 308 and 310 may not be needed to generate the estimation of the generating operation 312. Specifically, the deep learning model, such as a deep neural network, may be generated such that the model can receive processed signals as input and determine whether the signal is associated with an intruder and an approximation of the location of the source of the audio signal, without the need to generate estimation and generator operations. In other words, the model can use the input data, along with its trained data set to automatically determine the association of the signal with an intruder. Accordingly, the model may not use harmonic filters and feature vectors as described with respect to operations 308 and 310.

An optional identifying operation 308 identifies a highest correlated filter to the signal to identify the intruder. As one example, the identifying operation 308 may compare the processed signal 318 to a bank of harmonic kernel filters (e.g., harmonic kernel filter 320) to locate the filter most highly correlated with the processed signal 318. The harmonic kernel filters may include a filter for each blade pass frequency likely to be encountered during flight. For example, the bank of harmonic kernel filters may include harmonic kernel filters using base frequencies between 12 Hz and 136 Hz, with a harmonic kernel filter at each increment of 2 Hz. The harmonic kernel filters mimic expected harmonic structure, where a high intensity signal is expected at the base frequency along with additional signals at each harmonic associated with the base frequency, with the strength of the harmonic signals decreasing in intensity with increasing harmonic order. For example, a first harmonic signal should have a higher intensity than a third harmonic signal. The harmonic kernel filters may mimic expected harmonic structure of aircraft and/or of other sources of audio signal. Additional harmonic filters may be used to mimic other audio sources such as motor vehicles, trains, animals, etc. Where an audio signal correlates with one of the non-aircraft harmonic filters, the signal is likely to be associated with a non-aircraft source rather than an aircraft source. For example, some harmonic kernel filters may mimic the structure of an audio signal coming from a truck. When a multichannel audio signal correlates to this harmonic filter, the probability that the signal originates from one or more intruder aircraft decreases.

An optional generating operation 310 generates a feature vector using the preprocessed beamformed signal and the most relevant filter, e.g., the highest correlated harmonic filter. For example, the generating operation 310 may combine the processed signal 318 with the harmonic filter 320 to generate the feature vector 322. The feature vector 322 generally shows an intensity of the multichannel audio signal at each band 2 Hz wide. The feature vector 322 may be represented as an image (or other computer vision or computer readable format) where various colors (or other elements) within the feature vector 322 represent signal intensity within various bands. For example, the feature vector 322, shown in greyscale, shows black for no signal, white for a high intensity signal, and varying shades of grey, where lighter grey is a higher intensity signal and darker grey is a lower intensity signal.

A generating operation 312 generates an estimate that the signal is from an aircraft and directional information by providing the frequency vector to a model. In some implementations, the feature vector 322 may be passed to a binary classifier trained to make an encounter determination. In other implementations, the generating operation 312 may be carried out by, for example, a convolutional neural network. In some implementations, the model used to carry out the generating operation 312 may be DAA model 132. Once the generating operation 312 has determined that the feature vector 322 is correlated with a signal from an intruder, the DAA system may use the determination to take several actions including, for example, commanding an initial avoidance maneuver, estimating location of the intruder, or creating a track for the intruder.

Figure 7:
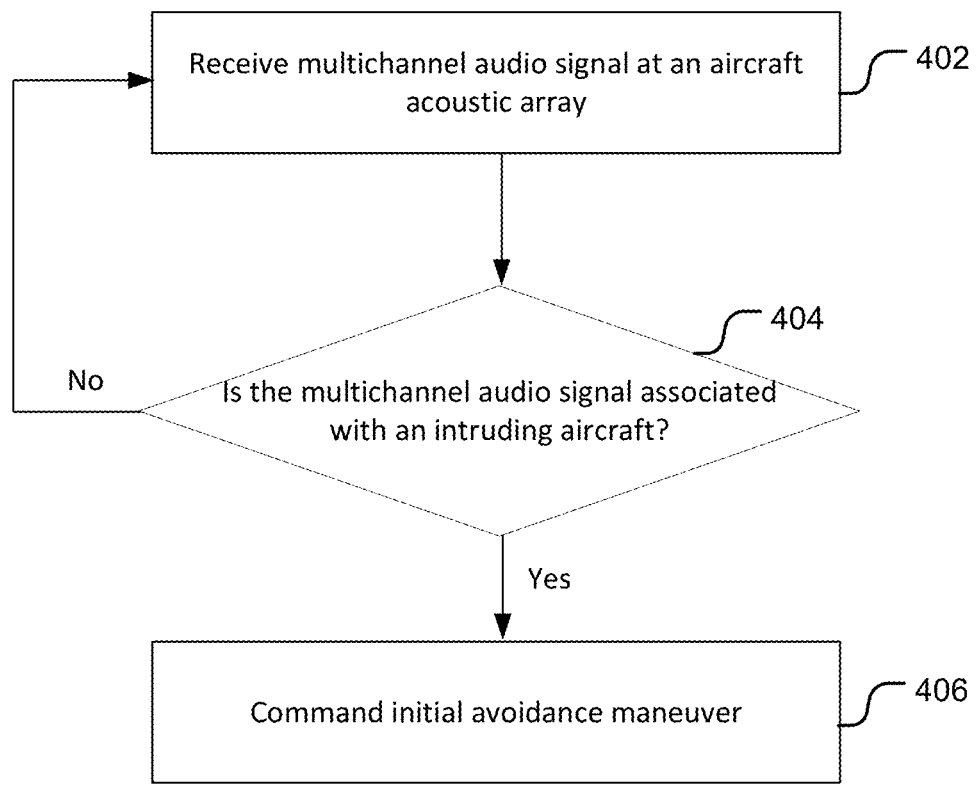
FIG. 7 is a flow diagram of example steps for commanding an initial avoidance maneuver based on a multichannel audio signal received by an acoustic based detection and avoidance system.

FIG. 7 is a flow diagram of example steps for commanding a maneuver or change in flight plan or path based on a multichannel audio signal received by an DAA system, such as one to increase a distance between the aircraft 100 and the intruder 102, e.g., avoidance maneuver. A receiving operation 402 receives a multichannel audio signal at an aircraft acoustic array. The receiving operation 402 may, in some implementations, include some processing of the multichannel audio signal. For example, the receiving operation 402 may time stamp signals, time align the multichannel audio signal across the channels, convert an analog signal to a digital signal, domain transform the signal, or otherwise process or manipulate the received multichannel audio signal.

In some implementations, the receiving operation 402 may include processing to compensate for one or more microphones of the array that are not functioning properly. For example the processing may use a variable beamforming approach to process signals from the operating microphones while ignoring signals from microphones that are not operating correctly. For example, the DAA system may "skip" or disregard signals from microphones that are not operating properly and continue with audio detection using functional microphones. The DAA system may identify non-functioning microphones during pre-flight checks of the audio array or by analyzing whether the signals from the various microphones include expected signals from the engines and propellers of the aircraft 100. Where the signals do not include such expected signals, the DAA system may assume microphones collecting the signals are not functioning as expected.

In an operation 404, the DAA system determines whether the multichannel audio signal is associated with an intruder. In some implementations, the DAA system may first determine whether the signal is directional and whether the signal includes more than the signal expected from the engines and propellers of the aircraft 100. Where the signal is not directional or includes mainly a signal from the engines of the aircraft 100, the DAA system may determine that the signal is not associated with an intruder. Where the signal is directional or includes additional signals, the DAA system may further analyze the signal or may immediately command an initial avoidance maneuver.

Additional analysis of the signal (or initial analysis, where directionality is not determined) may include comparison, such as through cross-correlation or other methods, of the multichannel audio signal to a bank of harmonic filters. In various implementations, the decision of the operation 402 may also be carried out by the DAA model 132, which may be implemented by a classifier, deep neural network, or other machine learning model. For example, the decision may be made using a random forest trained on frequencies of multichannel audio signals associated with aircraft.

Where the multichannel audio signal is not associated with an intruder, the method returns to the receiving operation 402. Where the multichannel audio signal is associated with an intruder, a commanding operation 406 commands an avoidance maneuver, which may be an initial avoidance maneuver or may be an additional maneuver depending on the number of maneuvers that may be needed to avoid the intruder and/or flight path of the intruder. The avoidance maneuver may be an avoidance maneuver that moves the aircraft 100 to a location where collision with another aircraft is statistically less likely. For example, the aircraft 100 may initially descend to a lower altitude to avoid collision, as long as the aircraft 100 is flying above its minimum altitude at the time of the maneuver. In some implementations, the avoidance maneuver may be selected by analyzing flight data to observe where collisions occur. In other implementations, the avoidance maneuver may be generated by the DAA model 132, which may use the multichannel audio signal characteristics to predict movement of the intruder 102. Accordingly, the DAA model 132 may select an avoidance maneuver likely to move the aircraft 100 further from the intruder 102.

Figure 8:
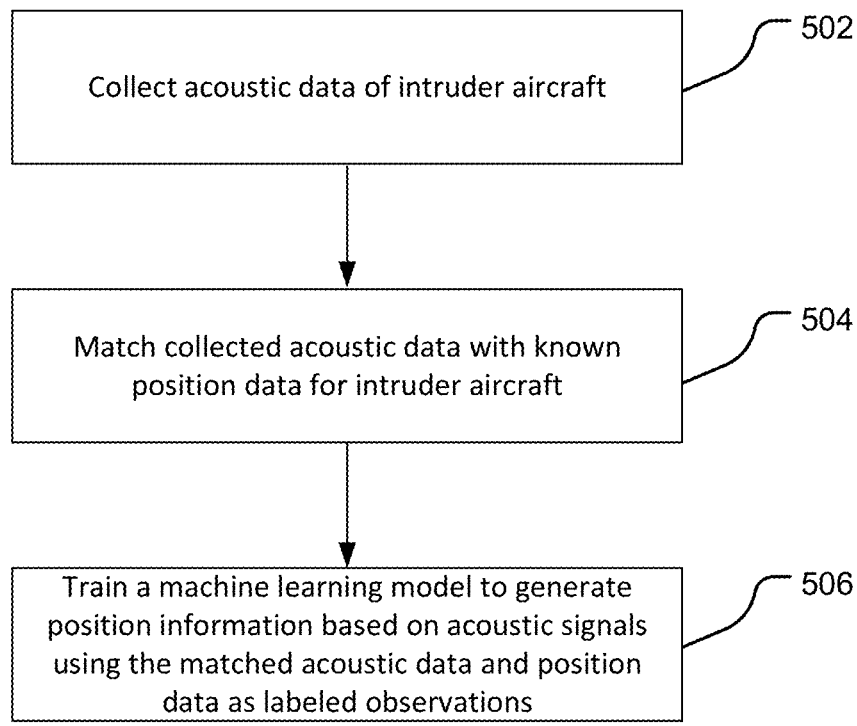
FIG. 8 is a flow diagram of example steps for training a model of an example acoustic based detection and avoidance system.

FIG. 8 is a flow diagram of example steps for training a model of an example detection and avoidance system. For example, the steps included in FIG. 8 may be used to train or generate the DAA model 132 described with respect to FIG. 4. Generally, the steps may be used to generate labeled data sets or to generate a deep neural network using known data. A collecting operation 502 collects acoustic data of intruder aircraft (or other likely intruder sources). The collecting operation 502 may use real-world data, simulated data, or a combination of real-world and simulated data. For example, real-world data may include audio data collected during a position-tracked flight, audio data collected from a ground-based array, or audio files of typical aircraft sounds.

The collecting operation 502 may use an array substantially similar to the array associated with the aircraft 100. For example, an array used in the collecting operation 502 may include the same number of microphones 114a-n spaced similarly. In one implementation, an array used in the collecting operation 502 is the array of the aircraft 100, where the aircraft 100 is flown with tracking sensors (e.g., on a GPS tracked flight) and intruder are also flown with similar tracking sensors. In another implementation, the array of the aircraft 100 may be used in the collecting operation in conjunction with a ground-based LiDAR or radar sensor. In yet another implementation, an array substantially similar to the array of the aircraft 100 may be used in the collecting operation 502 as a ground-based array.

The collecting operation 502 may employ simulated data generated using software simulations, physical simulations, or a combination of simulations. For example, acoustic simulation software may use acoustic data generated by aircraft test flights. In many implementations, the collecting operation 502 may collect data using multiple methods described above to generate a robust data set for training or generating the DAA model 132. Further, in some implementations, data generated through use of the DAA system may be used to update and re-train the DAA model 132.

A matching operation 504 matches collected acoustic data with known position data for intruder aircraft. The matching operation 504 may include in various implementations, matching ground-based or flight based location data to acoustic data collected at a ground-based array. For example, the matching operation 504 may use time alignment to match ground based LiDAR data, aircraft-based GPS data, or ADS-B data to acoustic data collected at a ground based array during the collecting operation 502. The matching operation 504 may also include matching ADS-B, GPS, or other positioning data to acoustic data collected at an aircraft mounted array.

A training operation 506 trains a machine learning model to generate position information based on acoustic signals using the matched acoustic data and position data as labeled observations. The training operation 506 may include generating a deep neural network based on the dataset created by the collecting operation 502 and the matching operation 504. The training operation 506 may also use the dataset (as labeled observations) to train other types of machine learning models, such as classifiers. In some implementations, the training operation 506 may use the same or similar datasets to generate or train several different types of machine learning models, which may be combined to form the DAA model 132. The training operation 506 may include multiple types of datasets described above. For example, the training operation 506 may generate a deep neural network using data from a ground based array, an aircraft mounted array, and simulated data.

As more data is collected, the DAA model 132 may be updated or re-trained. Accordingly, over time, the DAA system may become more accurate in its position estimations of intruder.

Figure 9:
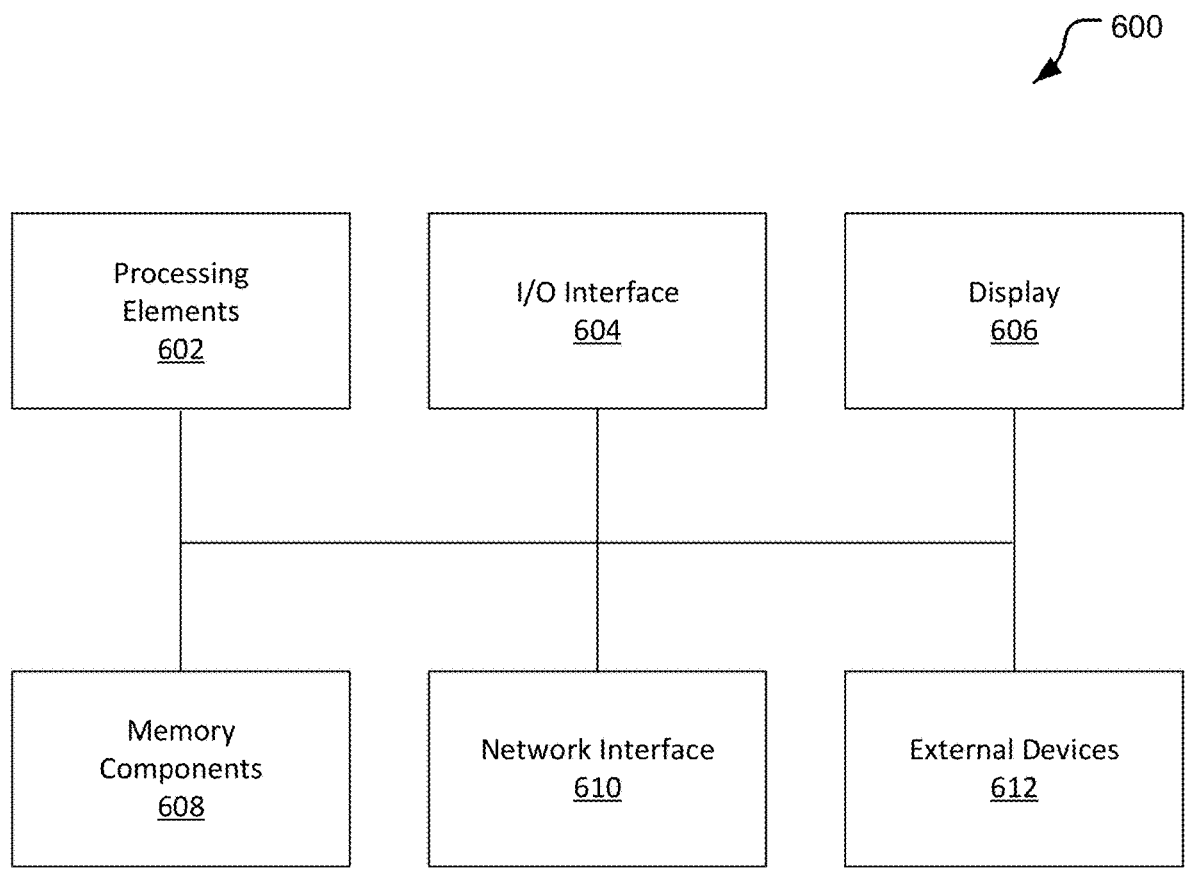
FIG. 9 is a schematic diagram of an example computer system implementing various embodiments in the examples described herein.

FIG. 9 is a schematic diagram of an example computer system 600 for implementing various embodiments in the examples described herein. A computer system 600 may be used to implement the DAA node 106 (in FIG. 2) or integrated into one or more components of the aircraft control system 104. For example, the DAA model 132 may be implemented using one or more of the components of the computer system 600 shown in FIG. 9. The computer system 600 is used to implement or execute one or more of the components or operations disclosed in FIGS. 1-8. In FIG. 9, the computer system 600 may include one or more processing elements 602, an input/output interface 604, a display 606, one or more memory components 608, a network interface 610, and one or more external devices 612. Each of the various components may be in communication with one another through one or more buses, communication networks, such as wired or wireless networks.

The processing element 602 may be any type of electronic device capable of processing, receiving, and/or transmitting instructions. For example, the processing element 602 may be a central processing unit, microprocessor, processor, or microcontroller. Additionally, it should be noted that some components of the computer 600 may be controlled by a first processor and other components may be controlled by a second processor, where the first and second processors may or may not be in communication with each other.

The memory components 608 are used by the computer 600 to store instructions for the processing element 602, as well as store data, such as multichannel audio data 134 and 140 (FIG. 4) and the like. The memory components 608 may be, for example, magneto-optical storage, read-only memory, random access memory, erasable programmable memory, flash memory, or a combination of one or more types of memory components.

The display 606 provides visual feedback to a user. Optionally, the display 606 may act as an input element to enable a user to control, manipulate, and calibrate various components of the DAA node 106 or the aircraft control 104 as described in the present disclosure. The display 606 may be a liquid crystal display, plasma display, organic light-emitting diode display, and/or other suitable display. In embodiments where the display 606 is used as an input, the display may include one or more touch or input sensors, such as capacitive touch sensors, a resistive grid, or the like.

The I/O interface 604 allows a user to enter data into the computer 600, as well as provides an input/output for the computer 600 to communicate with other devices or services. The I/O interface 604 can include one or more input buttons, touch pads, and so on.

The network interface 610 provides communication to and from the computer 600 to other devices. The network interface 610 includes one or more communication protocols, such as, but not limited to WiFi, Ethernet, Bluetooth, and so on. The network interface 610 may also include one or more hardwired components, such as a Universal Serial Bus (USB) cable, or the like. The configuration of the network interface 610 depends on the types of communication desired and may be modified to communicate via Wifi, Bluetooth, and so on.

The external devices 612 are one or more devices that can be used to provide various inputs to the computing device 600, e.g., mouse, microphone, keyboard, trackpad, or the like. The external devices 612 may be local or remote and may vary as desired. In some examples, the external devices 612 may also include one or more additional sensors.

The foregoing description has a broad application. For example, while examples disclosed herein may focus on central communication system, it should be appreciated that the concepts disclosed herein may equally apply to other systems, such as a distributed, central or decentralized system, or a cloud system. For example, some components may reside on a server in a client/server system, on a user mobile device, or on any device on the network and operate in a decentralized manner. One or more components of the systems may also reside in a controller virtual machine (VM) or a hypervisor in a VM computing environment. Accordingly, the disclosure is meant only to provide examples of various systems and methods and is not intended to suggest that the scope of the disclosure, including the claims, is limited to these examples.

The technology described herein may be implemented as logical operations and/or modules in one or more systems. The logical operations may be implemented as a sequence of processor-implemented steps directed by software programs executing in one or more computer systems and as interconnected machine or circuit modules within one or more computer systems, or as a combination of both. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

In some implementations, articles of manufacture are provided as computer program products that cause the instantiation of operations on a computer system to implement the procedural operations. One implementation of a computer program product provides a non-transitory computer program storage medium readable by a computer system and encoding a computer program. It should further be understood that the described technology may be employed in special purpose devices independent of a personal computer.

The above specification, examples and data provide a complete description of the structure and use of exemplary embodiments of the invention as defined in the claims. Although various embodiments of the claimed invention have been described above with a certain degree of particularity, or with reference to one or more individual embodiments, it is appreciated that numerous alterations to the disclosed embodiments without departing from the spirit or scope of the claimed invention may be possible. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

The invention claimed is:

1. A method comprising:
   receiving an audio signal at audio sensors of an aircraft;
   analyzing, by a detection and avoidance (DAA) model at computing resources associated with the aircraft, the received audio signal to determine directional information for a source of the audio signal;
   determining, by the DAA model, a location of the source of the audio signal based on the directional information;
   determining, by the DAA model, that the received audio signal is associated with an intruder aircraft at a range and an elevation relative to the aircraft and requires a maneuver to maintain an avoidance zone based on a classification of the intruder aircraft and the range and elevation of the intruder aircraft using a machine learning model of the DAA model, wherein the machine learning model is trained on acoustic data generated by different intruder sources and matched with location data for the intruder sources at different positions; and
   controlling, autonomously by a flight controller of the aircraft, flight of the aircraft to perform the maneuver based on the location of the source of the audio signal and the determination that the received audio signal is associated with the intruder aircraft.

2. The method of claim 1, wherein the location of the source of the audio signal is determined using at least one of a second machine learning model or a probabilistic tracking.

3. The method of claim 1, wherein analyzing the received audio signal comprises:
determining first directional information of the signal source based on the received audio signal at a first point in time and a geometry of the sensors; and
determining second directional information of the signal source based at least on changes in the received audio signal at a second point in time.

4. The method of claim 3, wherein the second directional information is determined based on changes in the received signal in response to an information-gathering maneuver of the aircraft.

5. The method of claim 1, wherein the directional information is determined using a deep learning model of the DAA model.

6. The method of claim 1, further comprising:
executing, by the aircraft, an initial maneuver responsive to the determination that the audio signal is associated with an intruder.

7. The method of claim 6, further comprising:
executing one or more additional maneuvers based on information about the intruder gathered after initiation of the initial maneuver.

8. The method of claim 1, further comprising:
beamforming the audio signal received at the sensors of the aircraft to generate a beamformed signal;
comparing the beamformed signal to a plurality of filters including known aircraft frequencies to determine that the audio signal is associated with an intruding aircraft; and
classifying the intruding aircraft as one of a plurality of possible types of aircraft based on the beamformed signal.

9. One or more non-transitory computer readable media encoded with instructions which, when executed by one or more processors of an acoustic aircraft detection system of an aircraft, cause the acoustic aircraft detection system to:
analyze an audio signal received by the acoustic aircraft detection system to determine directional information for a source of the audio signal;
generate, based on the directional information, an estimation for a location of the source of the audio signal;
analyze, by a machine learning model, the audio signal to determine that the audio signal is associated with an intruding aircraft, wherein the machine learning model is trained on aircraft data comprising acoustic data and position data, and wherein the machine learning model is trained to determine whether the audio signal is associated with an intruding aircraft;
determine a classification of the source of the audio signal; and
provide the estimation for the location of the source of the audio signal to a flight controller of the aircraft, wherein the flight controller is configured to control flight of the aircraft based on the estimation of the location of the source of the audio signal, the determination that the audio signal is associated with the intruding aircraft, and the classification of the intruder aircraft.

10. The one or more non-transitory computer readable media of claim 9, wherein the audio signal received by the acoustic aircraft detection system is provided to a second machine learning model to determine directional information for the source of the audio signal.

11. The one or more non-transitory computer readable media of claim 10, wherein the instructions further cause the acoustic aircraft detection system to beamform the received audio signal and to provide the beamformed audio signal to the machine learning model.

12. An unmanned aerial vehicle (UAV) comprising:
a plurality of acoustic sensors connected to the UAV;
an acoustic aircraft detection system comprising one or more processors, wherein the acoustic aircraft detection system is configured to:
analyze the audio signal using a machine learning model to determine that the audio signal is associated with an intruding aircraft, wherein the machine learning model is trained on aircraft data comprising acoustic data and position data;
analyze the audio signal to determine a classification of the source of the audio signal; and
analyze audio signal received by the plurality of acoustic sensors to generate an estimation in a three dimensional space of the intruding aircraft relative to the UAV; and
a flight controller configured to communicate with one or more control systems to control motion of the UAV, wherein the flight controller is further configured to control flight of the aircraft based on the estimation in the three dimensional space of the intruding aircraft relative to the UAV, the determination that the audio signal is associated with the intruding aircraft, and the classification of the intruding aircraft.

13. The UAV of claim 12, wherein the flight controller is further configured to receive communications from the acoustic aircraft detection system to initiate an information-gathering maneuver of the UAV.

14. The UAV of claim 13, wherein the acoustic aircraft detection system is configured to generate the estimation in space of the intruding aircraft relative to the UAV based at least partially on the audio signal from the intruding aircraft as the UAV executes the information-gathering maneuver.

15. The UAV of claim 12, wherein the acoustic aircraft detection system is configured to generate the estimation in space of the intruding aircraft relative to the UAV based at least partially on a geometry of the plurality of acoustic sensors connected to the UAV.

16. The UAV of claim 12, wherein the acoustic aircraft detection system is configured to generate the estimation in space of the intruding aircraft using at least a second machine learning model.

17. The method of claim 1, wherein determining the location of the source of the audio signal based on the directional information comprises:
generating, by the DAA model, a state estimation of the location of the source of the audio signal based on the directional information; and
updating, by the DAA model, the state estimation over time to track a change in the location of the source of the audio signal, wherein an algorithm is used to update the state estimation.

18. The method of claim 1, wherein the range of the intruder aircraft relative to the aircraft comprises an estimated range of the intruder aircraft relative to the aircraft and a confidence interval associated with the estimated range.

19. The method of claim 1, wherein the elevation of the intruder aircraft relative to the aircraft comprises an estimated angle of the intruder aircraft relative to the aircraft and a confidence interval associated with the estimated angle.

20. The method of claim 1, wherein the acoustic data used to train the machine learning model of the DAA comprises acoustic data of vehicles collected by audio sensors and synthetic acoustic data of vehicles generated by simulation, wherein the vehicles comprise airborne and non-airborne vehicles.

21. The method of claim 9, wherein determining the classification of the source of the audio signal comprises determining the classification of the intruder aircraft associated with the audio signal, wherein the classification comprises a class of aircraft of the intruder aircraft.

22. The method of claim 12, wherein analyzing the audio signal to determine a classification of the source of the audio signal comprises analyzing the audio signal to determine a classification of the intruding aircraft associated with the audio signal, wherein the classification comprises a class of aircraft of the intruder aircraft.

\* \* \* \* \*